(12) United States Patent
Kwon et al.

(10) Patent No.: US 10,083,103 B1
(45) Date of Patent: Sep. 25, 2018

(54) CIRCUITS RELATING TO THE CALCULATION OF POWER CONSUMPTION OF PHASE CHANGE MEMORY DEVICES, PHASE CHANGE MEMORY SYSTEMS INCLUDING THE SAME, AND METHODS RELATING TO THE CALCULATION OF POWER CONSUMPTION OF PHASE CHANGE MEMORY DEVICES

(71) Applicant: SK hynix Inc., Icheon-si, Gyeonggi-do (KR)

(72) Inventors: Jung Hyun Kwon, Seoul (KR); Sungeun Lee, Icheon-si (KR); Sang Gu Jo, Bucheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/823,190

(22) Filed: Nov. 27, 2017

(30) Foreign Application Priority Data

Mar. 16, 2017 (KR) ........................ 10-2017-0033286

(51) Int. Cl.
| G11C 7/00 | (2006.01) |
|---|---|
| G06F 11/30 | (2006.01) |
| H01L 27/24 | (2006.01) |
| G06F 1/32 | (2006.01) |
| G11C 13/00 | (2006.01) |
| H01L 45/00 | (2006.01) |
| G11C 7/10 | (2006.01) |

(52) U.S. Cl.
CPC ........ G06F 11/3062 (2013.01); G06F 1/3275 (2013.01); G11C 7/1006 (2013.01); G11C 13/0004 (2013.01); G11C 13/0038 (2013.01); H01L 27/2436 (2013.01); H01L 45/06 (2013.01); *G06F 2217/78* (2013.01)

(58) Field of Classification Search
CPC ....... G11C 7/22; G11C 7/1072; G11C 7/1006; G11C 7/1051; G11C 7/1078
USPC ........................................ 365/189.14, 189.16
See application file for complete search history.

(56) References Cited

U.S. PATENT DOCUMENTS

| 6,055,640 A | 4/2000 | Kageshima et al. |
|---|---|---|
| 2015/0103587 A1* | 4/2015 | Oh .......................... G11C 11/16 365/158 |

* cited by examiner

*Primary Examiner* — Son Dinh
(74) *Attorney, Agent, or Firm* — William Park & Associates Ltd.

(57) ABSTRACT

A circuit for calculating power consumption of a phase change memory (PCM) device may be provided. The circuit may include a plurality of pipelines and an arithmetic logic circuit. The plurality of pipelines may be configured to correspond to a plurality of write periods exhibiting different power consumption values during a write operation of the PCM device executed by a write command. The plurality of pipelines may shift or transmit data in synchronization with a clock signal. The arithmetic logic circuit may be configured to perform an adding operation of all of deviations of the power consumption values at a point of time that data transmission between at least two of the plurality of pipelines occurs, to thus generate a total power consumption value.

24 Claims, 21 Drawing Sheets

FIG.1
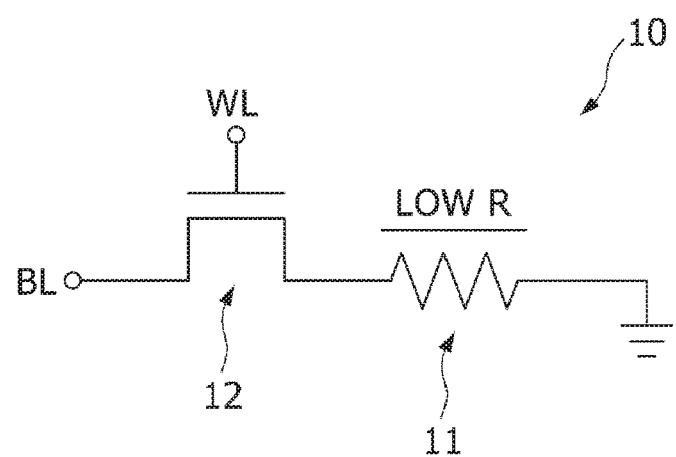
CRYSTALINE STATE
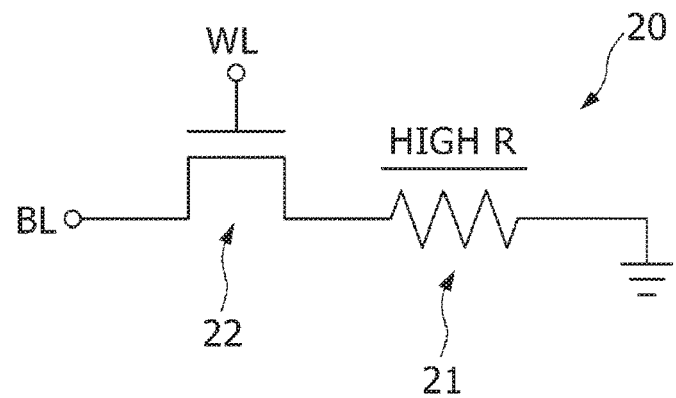
AMORPHOUS STATE

CIRCUITS RELATING TO THE CALCULATION OF POWER CONSUMPTION OF PHASE CHANGE MEMORY DEVICES, PHASE CHANGE MEMORY SYSTEMS INCLUDING THE SAME, AND METHODS RELATING TO THE CALCULATION OF POWER CONSUMPTION OF PHASE CHANGE MEMORY DEVICES

CROSS-REFERENCE TO RELATED APPLICATIONS

The present application claims priority under 35 U.S.C 119(a) to Korean Application No. 10-2017-0033286, filed on Mar. 16, 2017, which is herein incorporated by references in its entirety.

BACKGROUND

1. Technical Field

Various embodiments of the present disclosure may generally relate to phase change memories and, more particularly, to circuits relating to the calculation of power consumption of phase change memory devices, phase change memory systems including the circuits, and methods relating to calculating the power consumption of the phase change memory devices.

2. Related Art

Recently, memory devices using a semiconductor material have been increasingly in demand with the development of portable systems such as mobile phones. The memory devices are typically categorized as either volatile memory devices or nonvolatile memory devices. In particular, since most of the portable systems tend to employ a large capacity of memory, the nonvolatile memory devices retaining their stored data even when their power supplies are interrupted have been widely used in various portable systems. Ferroelectric random access memory (FeRAM) devices, magnetic random access memory (MRAM) devices, resistive random access memory (RRAM) devices, phase change memory (PCM) devices or the like are very attractive options for the next generation nonvolatile memory devices.

The PCM devices among the next generation nonvolatile memory devices have been known as viable options for nonvolatile memory devices since the PCM devices have a relatively simple cell structure as compared with the other nonvolatile memory devices and exhibit a relatively high operation speed like dynamic random access memory (DRAM) devices which belong to the volatile memory devices. The PCM devices may store and read information using a difference in electric conductivity between an amorphous phased material and a crystalline phased material of a specific material. In order to perform a write operation for storing data into cells of the PCM device, it may be necessary to force a current larger than a certain amount into the cells having a phase changeable material during a period longer than a certain time to change a phase of the phase changeable material. Accordingly, power consumption of the PCM devices may be higher than power consumption of the other next generation nonvolatile memory devices, when it comes to performing the write operation.

SUMMARY

According to an embodiment, there may be provided a circuit for calculating power consumption of a phase change memory (PCM) device. The circuit may include a plurality of pipelines and an arithmetic logic circuit. The plurality of pipelines may be configured to correspond to a plurality of write periods exhibiting different power consumption values during a write operation of the PCM device executed by a write command. The plurality of pipelines may shift or transmit data in synchronization with a clock signal. The arithmetic logic circuit may be configured to perform an adding operation of all of deviations of the power consumption values at a point of time that data transmission between at least two of the plurality of pipelines occurs, to thus generate a total power consumption value.

According to an embodiment, a phase change memory (PCM) system may be provided. The PCM may include a PCM device and a memory controller. The PCM device may be configured to store data therein during a plurality of write periods exhibiting different power consumption values while a write operation is performed by a write command. The memory controller may be configured to control the write operation of the PCM device according to a request received by the memory controller. The memory controller may include a plurality of pipelines and an arithmetic logic circuit. The plurality of pipelines may be configured to correspond to the plurality of write periods to shift or transmit data in synchronization with a clock signal. The arithmetic logic circuit may be configured to perform an adding operation of all of deviations of power consumption values at a point of time that data transmission between at least two of the plurality of pipelines occurs, to thus generate a total power consumption value.

According to an embodiment, there may be provided a method of calculating power consumption of a phase change memory (PCM) device. The method may include setting a plurality of write periods which are distinguished according to a power consumption value during a write operation of the PCM device. The method may include providing a plurality of pipelines respectively corresponding to the plurality of write periods. The method may include shifting or transmitting data in the plurality of pipelines or between the plurality of pipelines in synchronization with a clock signal. An adding operation of all of deviations of the power consumption values may be performed at a point of time that data transmission between at least two of the plurality of pipelines occurs, to thus calculate a total power consumption value.

According to an embodiment, there may be provided a power consumption calculation logic circuit. The circuit may include a pipeline portion including a plurality of pipelines configured to correspond to a plurality of write periods exhibiting different power consumption values during a write operation executed by a write command and configured to shift or transmit data in synchronization with a clock signal. The circuit may include an arithmetic logic circuit configured to generate a total power consumption value by performing an adding operation of all of deviations of the power consumption values at a point of time that data transmission between at least two of the plurality of pipelines occurs.

BRIEF DESCRIPTION OF THE DRAWINGS

FIG. 1 illustrates two different equivalent circuit diagrams of a cell of a phase change memory (PCM) device.

DETAILED DESCRIPTION

Figure 2:
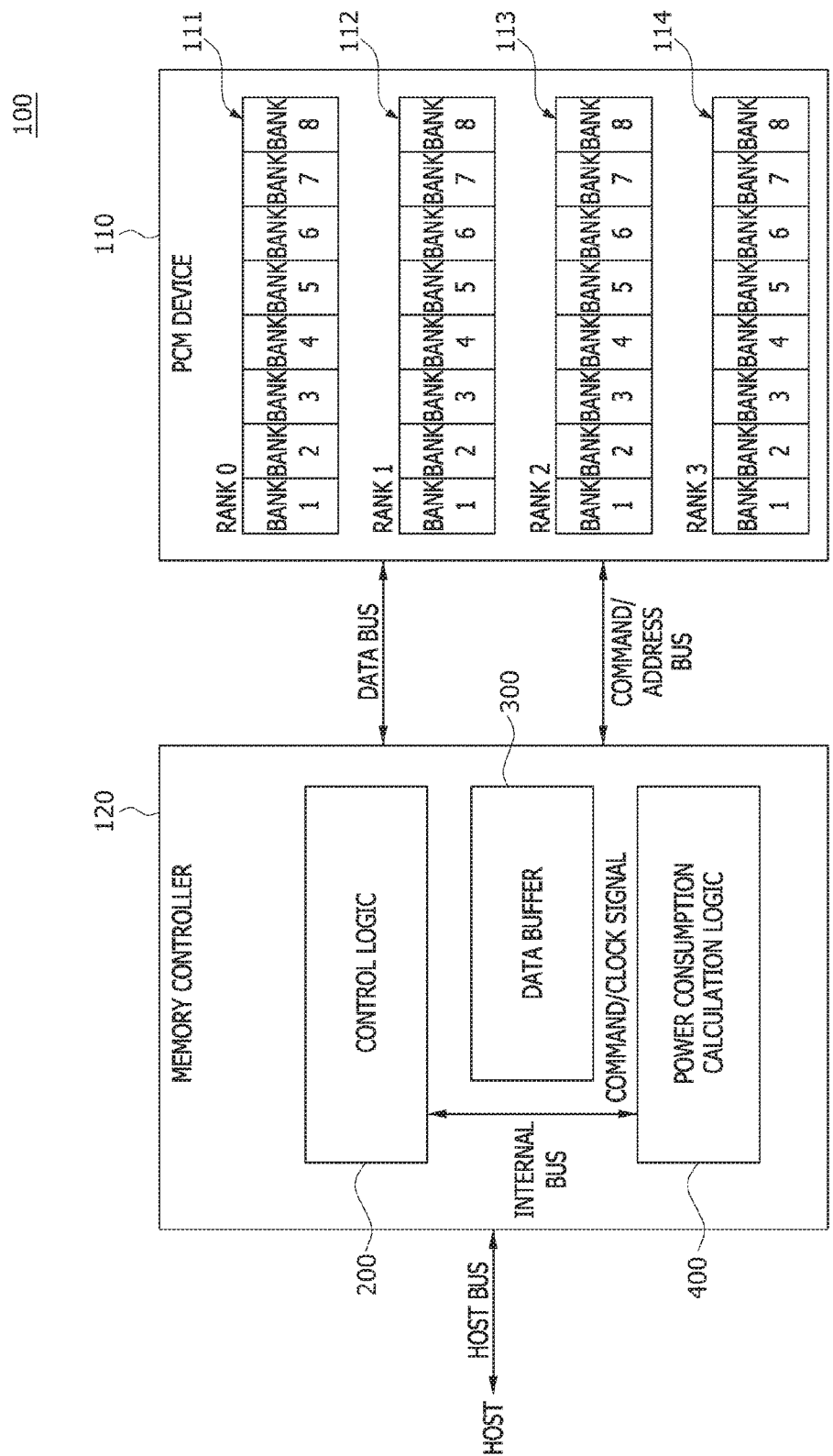
FIG. 2 is a block diagram illustrating a PCM system according to an embodiment of the present disclosure.

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

Various embodiments may be directed to circuits of calculating power consumption of phase change memories, phase change memory systems including the circuits, and methods of calculating the power consumption of the phase change memories.

FIG. 1 illustrates two different equivalent circuit diagrams of a cell of a phase change memory (PCM) device. Referring to FIG. 1, the PCM cell may be configured to include a phase changeable material. The phase changeable material may be a chalcogenide compound material whose electric resistance changes according to a temperature. That is, the phase changeable material may have a crystalline state or an amorphous state according to a temperature to exhibit a switching characteristic. For example, the chalcogenide compound material may be an alloy material of germanium (Ge), stibium (Sb) and tellurium (Te) (hereinafter, referred to as a GST material). The GST material may have an amorphous state if the GST material is heated to a temperature which is higher than a melting point thereof and is cooled down rapidly. In contrast, the GST material having an amorphous state may be transformed to have a crystalline state if the GST material having an amorphous state is heated to a temperature between a crystallization temperature and a melting point thereof and is gradually cooled down. The GST material may be heated up by forcing a current into the GST material. A phase of the GST material may be changed within a short period, for example, within approximately five nanoseconds.

Referring to FIG. 1, a PCM cell 10 may be configured to include an alloy resistor 11 having a crystalline state and a selection transistor 12 which are coupled in series between a bit line BL and a ground voltage terminal. If the alloy resistor 11 has a crystalline state, an electrical resistivity of the alloy resistor 11 may be relatively low to correspond to a logic "high" level or a logic "1" level. If a word line voltage is applied to a word line WL connected to a gate of the selection transistor 12 to turn on the selection transistor 12, a relatively large current may flow from the bit line BL toward the ground voltage terminal through the selection transistor 12 and the alloy resistor 11 because the alloy resistor 11 having a crystalline state has a relatively low resistivity. In such a case, a voltage level of the bit line BL, which is pre-charged, may be pulled down to a ground voltage. If a large current flows through the alloy resistor 11, a phase of the alloy resistor 11 may change. For example, if a large current flows through the alloy resistor 11 to generate heat, a temperature of the alloy resistor 11 may reach a melting point of the alloy resistor 11 and the alloy resistor 11 may melt to have a liquid state (i.e., a fluid state). If the alloy resistor 11 having a fluid state is rapidly cooled down, the alloy resistor 11 may be solidified to have an amorphous state because there is no sufficient time for atoms of the alloy resistor 11 to be rearranged.

Referring again to FIG. 1, another PCM cell 20 may be configured to include an alloy resistor 21 having an amorphous state and a selection transistor 22 which are coupled in series between the bit line BL and the ground voltage terminal. If the alloy resistor 21 has an amorphous state, an electrical resistivity of the alloy resistor 21 may be relatively high to correspond to a logic "low" level or a logic "0" level. If a word line voltage is applied to a word line WL connected to a gate of the selection transistor 22 to turn on the selection transistor 22, a relatively small current may flow from the bit line BL toward the ground voltage terminal through the selection transistor 22 and the alloy resistor 21 because the alloy resistor 21 having an amorphous state has a relatively high resistivity. In such a case, the bit line BL may maintain a pre-charged state. If a small current flows through the alloy resistor 21 having an amorphous state during a relatively long period, the alloy resistor 21 may be heated to reach a crystallization temperature but not to reach the melting point because the small current flowing through the alloy resistor 21 is insufficient to melt the alloy resistor 21. Thus, the alloy resistor 11 may be gradually transformed to have a crystalline state.

As described above, a relatively large current has to be supplied into the PCM cell during a relatively short period in order to perform a write operation for transforming the alloy resistor 11 having a logic "high(1)" level into the alloy resistor 11 having a logic "low(0)" level. In contrast, a relatively small current has to be supplied into the PCM cell during a relatively long period in order to perform a write operation for transforming the alloy resistor 21 having a logic "low(0)" level into the alloy resistor 21 having a logic "high(1)" level. Accordingly, electric power consumed during a write operation for changing a logic "high(1)" level of the PCM cell into a logic "low(0)" level may be different from electric power consumed during a write operation for changing a logic "low(0)" level of the PCM cell into a logic "high(1)" level. A cell current flowing through the PCM cell 10 or 20 during a read operation may be smaller than a cell current flowing through the PCM cell 10 or 20 during the write operation. Thus, electric power consumed during a read operation may be different from electric power consumed during a write operation.

FIG. 2 is a block diagram illustrating a PCM system 100 according to an embodiment of the present disclosure. Referring to FIG. 2, the PCM system 100 may be configured to include a PCM device 110 and a memory controller 120. The PCM device 110 may include a plurality of ranks, for example, first to fourth ranks 111~114. Each of the first to fourth ranks 111~114 may include a plurality of banks, for example, first to eighth banks BANK1~BANK8. Each of the first to eighth banks BANK1~BANK8 may have a plurality of PCM cells which are arrayed in a matrix form, and each of the PCM cells may correspond to the PCM cell 10 or 20 described with reference to FIG. 1.

The memory controller 120 may be coupled to a host through a host bus. The memory controller 120 may be coupled to the PCM device 110 through a data bus and a command and address (command/address) bus. The memory controller 120 may include a control logic circuit 200, a data buffer 300, and a power consumption calculation logic circuit 400. The control logic circuit 200 may receive commands which are transmitted through the host bus and may execute operations corresponding to the commands. In addition, the control logic circuit 200 may communicate with the PCM device 110 through the data bus and the command/address bus. The data buffer 300 may store data to be transmitted to the host or the PCM device 110 through the host bus or the data bus. The power consumption calculation logic circuit 400 may calculate total electric power consumed by the PCM device 110 whenever each clock pulse of a clock signal is inputted while the write operation or the read operation is performed. The power consumption calculation logic circuit 400 may receive the clock signal and the commands from the control logic circuit 200 through an internal bus and may calculate and output the total electric power consumed by PCM device 110 to the control logic circuit 200.

Figure 3:
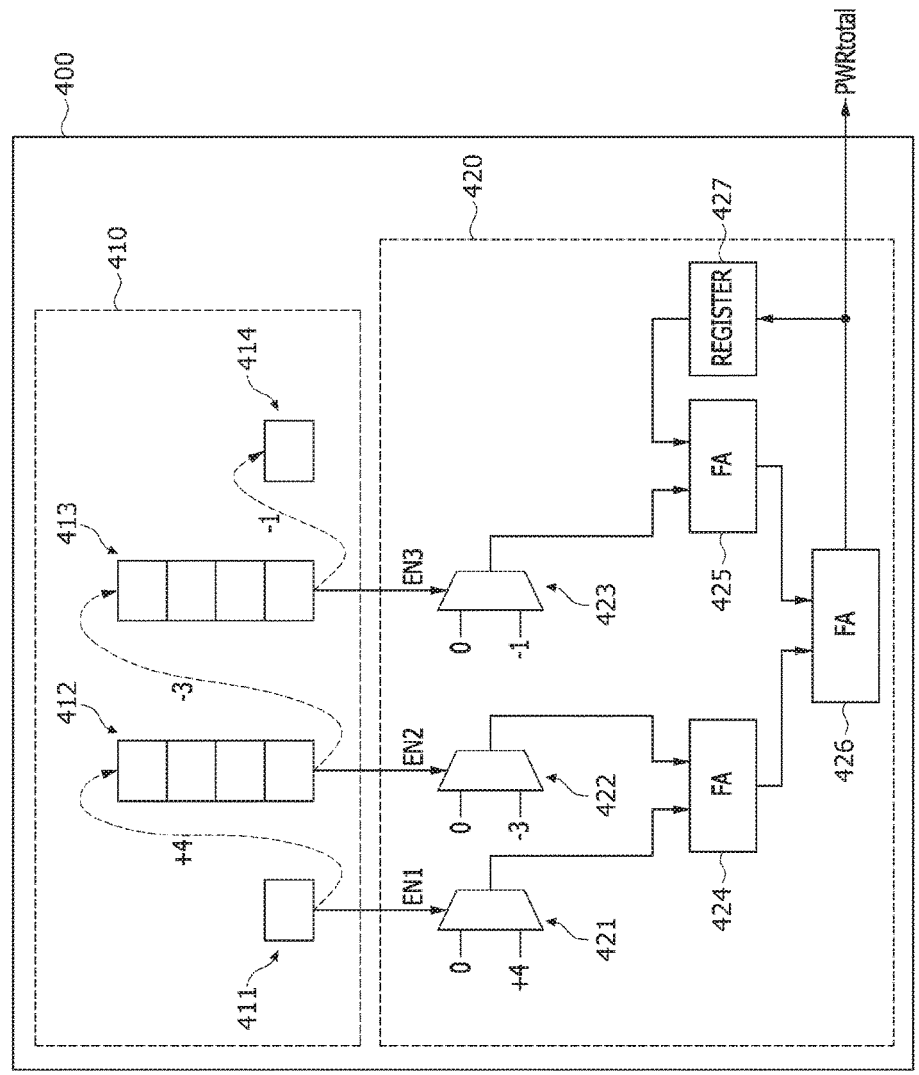
FIG. 3 is a logic circuit diagram illustrating an arithmetic logic unit for calculating power consumption of a memory controller included in the PCM system of FIG. 2.
Figure 4:
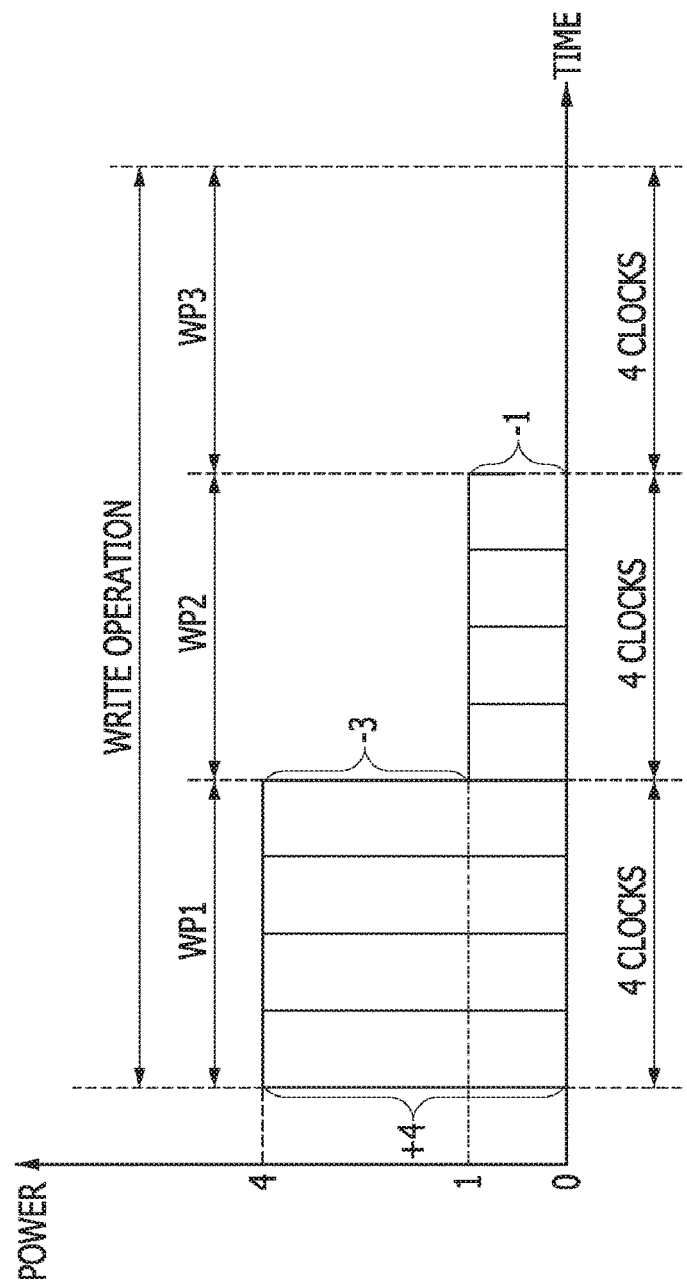
FIG. 4 is a graph illustrating a variation of power consumption in a write operation of PCM cells for realizing pipelines of the arithmetic logic unit illustrated in FIG. 3.

FIG. 3 is a logic circuit diagram illustrating an example of the power consumption calculation logic circuit 400 included in the PCM system 100 of FIG. 2, and FIG. 4 is a graph illustrating a variation of power consumption in a write operation of PCM cells for realizing pipelines of the power consumption calculation logic circuit 400 illustrated in FIG. 3. Referring to FIG. 3, the power consumption calculation logic circuit 400 may be configured to include a pipeline portion 410 and an arithmetic logic circuit 420. The pipeline portion 410 may have a plurality of pipelines, for example, first to fourth pipelines 411~414. The arithmetic logic circuit 420 may have a plurality of multiplexers (e.g., first to third multiplexers 421, 422, and 423), a full adder portion including a plurality of full adders (e.g., first to third full adders 424, 425, and 426), and a register 427. The pipeline portion 410 including the first to fourth pipelines 411~414 may be appropriately designed according to variation of the electric power consumed by the write operation of the PCM cells included in the PCM device 110. In order to appropriately design the pipeline portion 410, it may be necessary to measure variance of the electric power consumed by the write operation of the PCM cells in advance and to quantify the variance of the electric power consumed by the write operation as a function of time.

An example of the variation of the electric power consumed during the write operation of the PCM cell is illustrated in FIG. 4. In FIG. 4, the abscissa denotes time in units of clocks and the ordinate denotes electric power consumption in an arbitrary unit. The electric power consumption may be proportional to an amount of current flowing through the PCM cell during the write operation. As illustrated in FIG. 4, the write operation executed by a single write command will be described hereinafter in conjunction with a case that twelve clock cycles (i.e., first to twelfth clock cycles) are required to perform the write operation. In addition, the write operation illustrated in FIG. 4 will be described in conjunction with a case that the electric power corresponding to "4" is consumed during a first write period WP1 including the first to fourth clock cycles, the electric power corresponding to "1" is consumed during a second write period WP2 including the fifth to eighth clock cycles, and no electric power is consumed during a third write period WP3 including the ninth to twelfth clock cycles. The number of the clock cycles required to perform the write operation and the electric power consumed during each clock cycle may be different according to a design of the PCM cell. However, the present embodiments may be equally applicable to all of the cases. The write operation of a PCM cell executed by a single write command may be performed during a write period including the first to third write periods WP1, WP2, and WP3, and the electric powers consumed during the first to third write periods WP1, WP2 and WP3 may be different from each other.

The electric power corresponding to a value of "4" may be consumed during each of the first to fourth clock cycles constituting the first write period WP1. Even though the electric power consumed during the first write period WP1 is not uniform according to the first to fourth clock cycles, a deviation of the electric power consumed during the first write period WP1 may be as small to be negligible. The electric power corresponding to a value of "1" may be consumed during each of the fifth to eighth clock cycles constituting the second write period WP2. Even though the electric power consumed during the second write period WP2 is not uniform according to the fifth to eighth clock cycles, a deviation of the electric power consumed during the second write period WP2 may be as small to be negligible. The electric power may be lowered from an amount of "4" into an amount of "1" when the time is changed from the first write period WP1 into the second write period WP2. In such a case, the deviation of the electric power may be negative three (−3). The electric power may be lowered from an amount of "1" into an amount of "0" when the time is changed from the second write period WP2 into the third write period WP3. In such a case, the deviation of the electric power may be negative one (−1).

Referring again to FIG. 3, the pipeline portion 410 may include the first to fourth pipelines 411~414. In an embodiment, each of the first to fourth pipelines 411~414 may be realized using a shift register. The first to fourth pipelines 411~414 may be coupled in series to have a chain form. That is, data may be transmitted through the first to fourth pipelines 411~414 in sequence. The first pipeline 411 may be configured to include a single storage element corresponding to an input period of a write command. The second pipeline 412 may be configured to include four storage elements corresponding to the number of clock cycles included in the first write period WP1, and the third pipeline 413 may be configured to include four storage elements corresponding to the number of clock cycles included in the second write period WP2. The fourth pipeline 414 should be configured to include a plurality of storage elements (e.g., four storage elements) corresponding to the number of clock cycles included in the third write period WP3. However, since no electric power is consumed during the third write period WP3, the fourth pipeline 414 may be configured to include a single storage element.

The second and third pipelines 412 and 413, each of which has four storage elements, may transmit the data in synchronization with the clock signal. Similarly, the data transmission between the pipelines 411~414 may also be performed in synchronization with the clock signal. If a write command is inputted to the power consumption calculation logic circuit 400, a specific datum may be stored into the storage element of the first pipeline 411. The specific datum may be a binary logic signal which is set arbitrarily. In an embodiment, the specific datum may correspond to a signal having a logic "high" level. The write command may be inputted to the power consumption calculation logic circuit 400 in synchronization with a first clock pulse of the clock signal to perform the write operation. The write operation may be actually performed from a point of time that a second clock pulse of the clock signal is inputted, and the datum stored in the first pipeline 411 may be transmitted to the first storage element of the second pipeline 412 in synchronization with the second clock pulse of the clock signal. At this point of time, the electric power consumption may increase from an amount of "0" to an amount of "4". Thus, the deviation of the electric power may be positive four (+4). The datum stored in the first storage element of the second pipeline 412 may be shifted to the second storage element of the second pipeline 412 in synchronization with a third clock pulse of the clock signal. The datum stored in the second storage element of the second pipeline 412 may be shifted to the third storage element of the second pipeline 412 in synchronization with a fourth clock pulse of the clock signal. The datum stored in the third storage element of the second pipeline 412 may be shifted to the fourth storage element of the second pipeline 412 in synchronization with a fifth clock pulse of the clock signal. As a result, the write operation during the first write period WP1 may terminate.

The second write period WP2 may start from a point of time that a sixth clock pulse of the clock signal is inputted, and the datum stored in the fourth storage element of the second pipeline 412 may be transmitted to the first storage element of the third pipeline 413 in synchronization with the sixth clock pulse of the clock signal. At this point of time, the electric power consumption may be reduced from an amount of "4" to an amount of "1". Thus, the deviation of the electric power may be negative three (−3). The datum stored in the first storage element of the third pipeline 413 may be shifted to the second storage element of the third pipeline 413 in synchronization with a seventh clock pulse of the clock signal. The datum stored in the second storage element of the third pipeline 413 may be shifted to the third storage element of the third pipeline 413 in synchronization with an eighth clock pulse of the clock signal. The datum stored in the third storage element of the third pipeline 413 may be shifted to the fourth storage element of the third pipeline 413 in synchronization with a ninth clock pulse of the clock signal. As a result, the write operation during the second write period WP1 may terminate.

The third write period WP3 may start from a point of time that a tenth clock pulse of the clock signal is inputted, and the datum stored in the fourth storage element of the third pipeline 413 may be transmitted to the storage element of the fourth pipeline 414 in synchronization with the tenth clock pulse of the clock signal. At this point of time, the electric power consumption may be reduced from an amount of "1" to an amount of "0". Thus, the deviation of the electric power may be negative one (−1). Although the write operation of the PCM cell is performed until a thirteenth clock pulse of the clock signal is inputted, the write operation performed after the tenth clock pulse of the clock signal may not affect the calculation of the electric power consumption because no electric power is consumed after the tenth clock pulse of the clock signal. That is, no electric power is consumed during the write operation after the tenth clock pulse of the clock signal.

The first pipeline 411, the second pipeline 412, and the third pipeline 413 may generate a first enablement signal EN1, a second enablement signal EN2, and a third enablement signal EN3, respectively. The first enablement signal EN1 generated by the first pipeline 411 may maintain a first level, for example, a logic "low" level before the second clock pulse is inputted, and the first level of the first enablement signal EN1 may be changed into a second level, for example, a logic "high" level at a point of time that the datum stored in the first pipeline 411 is transmitted to the first storage element of the second pipeline 412 in synchronization with the second clock pulse. That is, the first level of the first enablement signal EN1 may be changed into the second level at a point of time that the deviation of the electric power consumption is positive four (+4). The second enablement signal EN2 generated by the second pipeline 412 may maintain a logic "low" level before the sixth clock pulse is inputted, and the logic "low" level of the second enablement signal EN2 may be changed into a logic "high" level at a point of time that the datum stored in the fourth storage element of the second pipeline 412 is transmitted to the first storage element of the third pipeline 413 in synchronization with the sixth clock pulse. That is, a level of the second enablement signal EN2 may be changed from a logic "low" level into a logic "high" level at a point of time that the deviation of the electric power consumption is negative three (−3). The third enablement signal EN3 generated by the third pipeline 413 may maintain a logic "low" level before the tenth clock pulse is inputted, and the logic "low" level of the third enablement signal EN3 may be changed into a logic "high" level at a point of time that the datum stored in the fourth storage element of the third pipeline 413 is transmitted to the storage element of the fourth pipeline 414 in synchronization with the tenth clock pulse. That is, a level of the third enablement signal EN3 may be changed from a logic "low" level into a logic "high" level at a point of time that the deviation of the electric power consumption is negative one (−1).

The arithmetic logic circuit 420 may include the first multiplexer 421, the second multiplexer 422, and the third multiplexer 423. The first multiplexer 421 may have a first data input terminal, a second data input terminal, a first enablement signal input terminal, and an output terminal. A datum corresponding to a value "0" may be inputted to the first multiplexer 421 through the first data input terminal, and a datum corresponding to the deviation (i.e., "+4") of the electric power consumption at a point of time that a datum stored in the first pipeline 411 is transmitted to the second pipeline 412 may be inputted to the first multiplexer 421 through the second data input terminal. In addition, the first enablement signal EN1 outputted from the first pipeline 411 may be inputted to the first multiplexer 421 through the first enablement signal input terminal. If the first enablement signal EN1 has a logic "low" level, the first multiplexer 421 may output the datum corresponding to a value "0" applied to the first data input terminal through the output terminal of the first multiplexer 421. If the second enablement signal EN2 has a logic "high" level, the first multiplexer 421 may output the datum corresponding to a value "+4" applied to the second data input terminal through the output terminal of the first multiplexer 421. As a result, the first multiplexer 421 may output a datum corresponding to a value "+4" if a datum stored in the first pipeline 411 is transmitted to the second pipeline 412, and the first multiplexer 421 may output a datum corresponding to a value "0" if otherwise.

The second multiplexer 422 may have a first data input terminal, a second data input terminal, a second enablement signal input terminal, and an output terminal. A datum corresponding to a value "0" may be inputted to the second multiplexer 422 through the first data input terminal, and a datum corresponding to the deviation (i.e., "−3") of the electric power consumption at a point of time that a datum stored in the second pipeline 412 is transmitted to the third pipeline 413 may be inputted to the second multiplexer 422 through the second data input terminal. In addition, the second enablement signal EN2 outputted from the second pipeline 412 may be inputted to the second multiplexer 422 through the second enablement signal input terminal. If the second enablement signal EN2 has a logic "low" level, the second multiplexer 422 may output the datum corresponding to a value "0" applied to the first data input terminal through the output terminal of the second multiplexer 422. If the second enablement signal EN2 has a logic "high" level, the second multiplexer 422 may output the datum corresponding to a value "−3" applied to the second data input terminal through the output terminal of the second multiplexer 422. As a result, the second multiplexer 422 may output a datum corresponding to a value "−3" if a datum stored in the second pipeline 412 is transmitted to the third pipeline 413, and the second multiplexer 422 may output a datum corresponding to a value "0" if otherwise.

The third multiplexer 423 may have a first data input terminal, a second data input terminal, a third enablement signal input terminal, and an output terminal. A datum corresponding to a value "0" may be inputted to the third multiplexer 423 through the first data input terminal, and a datum corresponding to the deviation (i.e., "−1") of the electric power consumption at a point of time that a datum stored in the third pipeline 413 is transmitted to the fourth pipeline 414 may be inputted to the third multiplexer 423 through the second data input terminal. In addition, the third enablement signal EN3 outputted from the third pipeline 413 may be inputted to the third multiplexer 423 through the third enablement signal input terminal. If the third enablement signal EN3 has a logic "low" level, the third multiplexer 423 may output the datum corresponding to a value "0" applied to the first data input terminal through the output terminal of the third multiplexer 423. If the third enablement signal EN3 has a logic "high" level, the third multiplexer 423 may output the datum corresponding to a value "−1" applied to the second data input terminal through the output terminal of the third multiplexer 423. As a result, the third multiplexer 423 may output a datum corresponding to a value "−1" if a datum stored in the third pipeline 413 is transmitted to the fourth pipeline 414, and the third multiplexer 423 may output a datum corresponding to a value "0" if otherwise.

The arithmetic logic circuit 420 may also include the first full adder 424, the second full adder 425, and the third full adder 426 which are hierarchically disposed. That is, the first full adder 424 and the second full adder 425 may be disposed at a first level, and the third full adder 426 may be disposed at a second level. The first full adder 424 disposed at the first level may receive an output datum of the first multiplexer 421 and an output datum of the second multiplexer 422. The first full adder 424 disposed at the first level may perform an adding operation of the output datum of the first multiplexer 421 and the output datum of the second multiplexer 422 to output the result of the adding operation. The second full adder 425 disposed at the first level may receive an output datum of the third multiplexer 423 and an output datum of the register 427. The second full adder 425 disposed at the first level may perform an adding operation of the output datum of the third multiplexer 423 and the output datum of the register 427 to output the result of the adding operation. The third full adder 426 may receive an output datum of the first full adder 424 and an output datum of the second full adder 425 and may perform an adding operation of the output datum of the first full adder 424 and the output datum of the second full adder 425 to output the result of the adding operation. An output datum of the third full adder 426 may denote a current total power consumption value PWRtotal. The current total power consumption value PWRtotal may be stored into the register 427, and the current total power consumption value PWRtotal stored in the register 427 may be inputted to the second full adder 425 in synchronization with a next clock pulse of the clock signal. The current total power consumption value PWRtotal outputted from the third full adder 426 may correspond to a previous total power consumption value at a point of time that the next clock pulse of the clock signal is created. The current total power consumption value PWRtotal may be fed back to the second full adder 425 through the register 427 at the point of time that the next clock pulse of the clock signal is created. Thus, at the point of time that the next clock pulse of the clock signal is created, a total power consumption value may be calculated to include the current total power consumption value PWRtotal corresponding to the previous total power consumption value.

Figure 5:
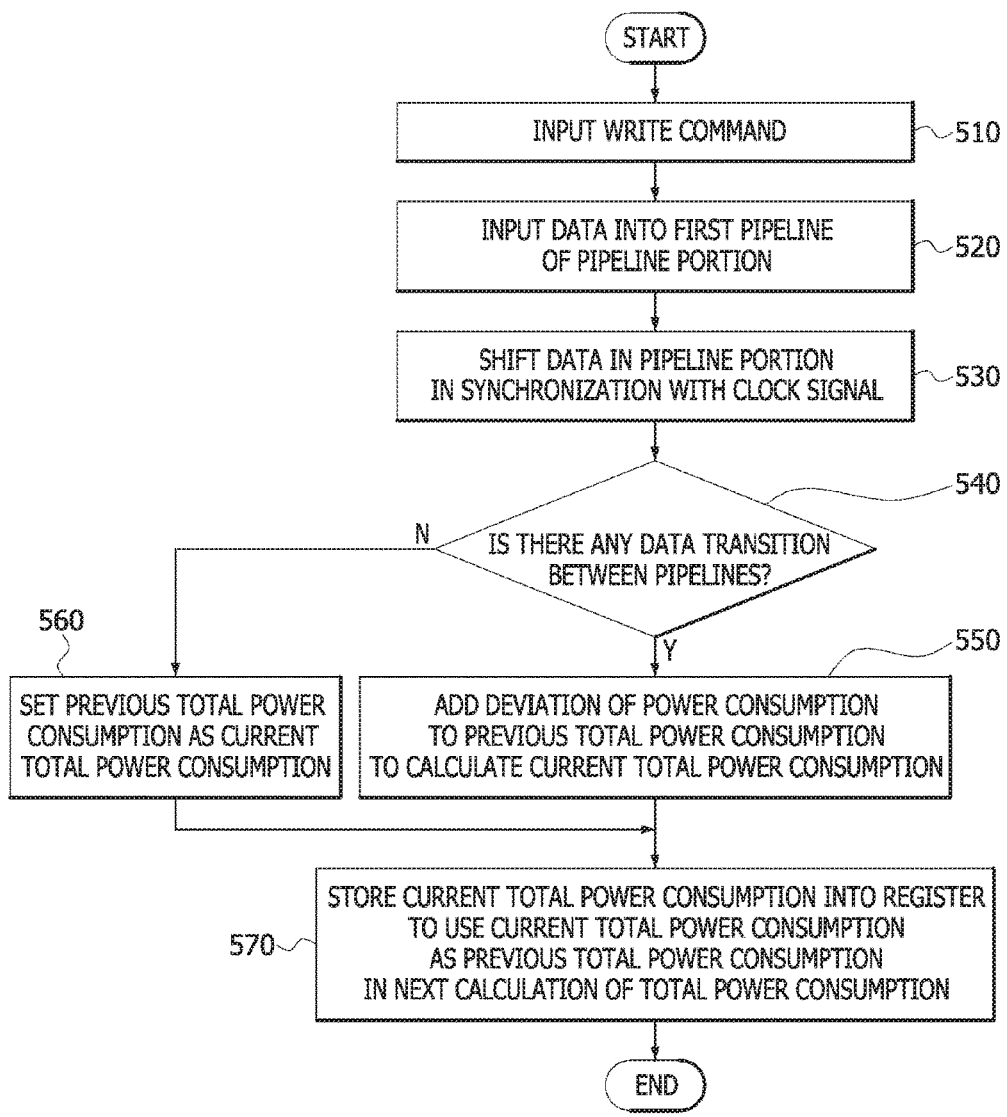
FIG. 5 is a flowchart illustrating a method of calculating power consumption in a PCM system having a plurality of banks, according to an embodiment of the present disclosure.

FIG. 5 is a flowchart illustrating a method of calculating power consumption in a PCM system having a plurality of banks, according to an embodiment of the present disclosure. Referring to FIG. 5, if a write command WR is inputted to a memory controller (see a step 510), a datum may be inputted to a first pipeline of a pipeline portion (see a step 520). The datum may be shifted and transmitted in the pipeline portion in synchronization with clock pulses of a clock signal (see a step 530). In such a case, the pipeline portion may discriminate whether a data transition between pipelines included in the pipeline portion occurs (see a step 540). If a data transition between the pipelines occurs to generate a deviation of power consumption, the deviation of power consumption may be added to a previous total power consumption value to calculate a current total power consumption value (see a step 550). In contrast, if no data transition between the pipelines occurs not to generate the deviation of power consumption, the previous total power consumption value may be set as the current total power consumption value (see a step 560). Subsequently, the current total power consumption value calculated or set in the step 550 or 560 may be stored into a register, and the current total power consumption value stored in the register may be used as the previous total power consumption value in a next calculation step of the current total power consumption value (see a step 570).

Figure 6:
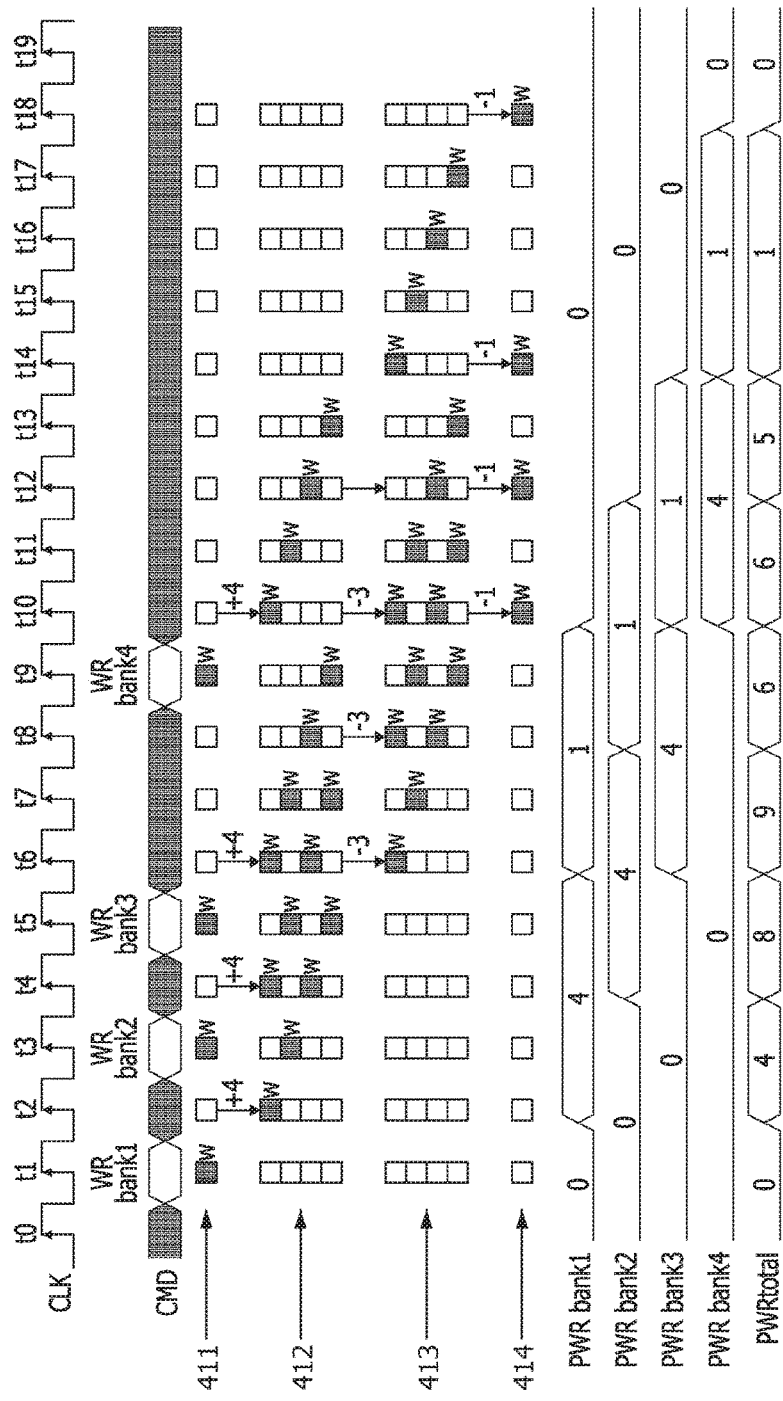
FIG. 6 is a timing diagram illustrating a method of calculating power consumption in a PCM system having a plurality of banks, according to an embodiment of the present disclosure.
Figure 7:
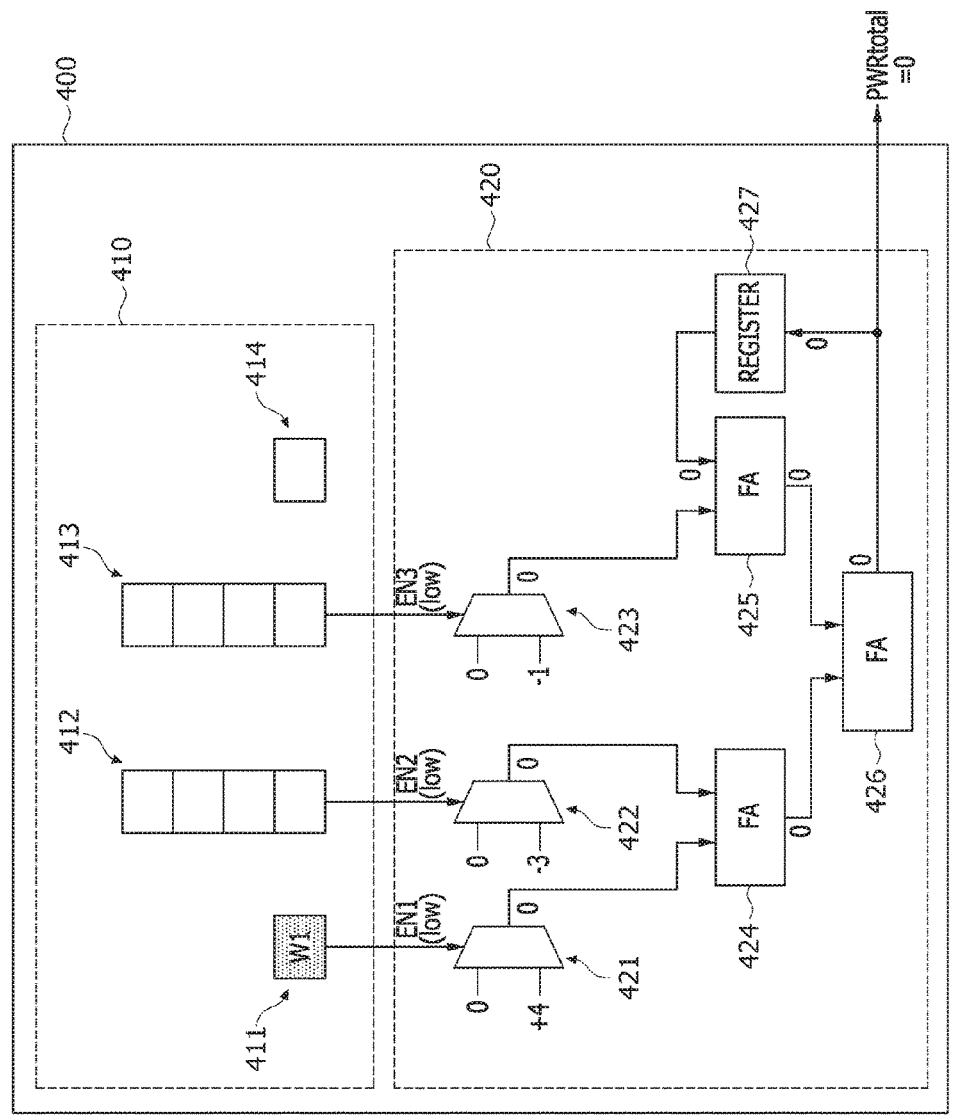
FIGS. 7 to 21 are logic circuit diagrams illustrating arithmetic logic operations for calculating power consumption in each of clock cycles illustrated in FIG. 6.

FIG. 6 is a timing diagram illustrating a method of calculating power consumption in a PCM system having a plurality of banks, according to an embodiment of the present disclosure, and FIGS. 7 to 21 are logic circuit diagrams illustrating arithmetic logic operations for calculating power consumption in each of clock cycles illustrated in FIG. 6. Referring to FIGS. 6 to 21, a clock signal CLK having a certain cycle time may be supplied to a PCM system, and commands CMD may be provided in synchronization with rising edges of the clock signal CLK. If the write command WR for the first bank BANK1 included in the first rank 111 is provided in synchronization with a first clock pulse t1 of the clock signal CLK, a first datum W1 may be inputted to the first pipeline 411. Since no power consumption by the write operation occurs before the write operation, the power consumption value may be zero at a point of time that the first datum W1 is inputted to the first pipeline 411. For example, as illustrated in FIG. 7, all of the first to third enablement signals EN1, EN2, and EN3 respectively outputted from the first to third pipelines 411, 412, and 413 may have a logic "low" level at the point of time that the first datum W1 is inputted to the first pipeline 411. Thus, all of the first to third multiplexers 421, 422, and 423 may output a datum corresponding to a value "0". Since an output datum of the third full adder 426 has a level corresponding to a value "0" at a point of time that a previous clock pulse of the clock signal CLK is created, the datum "0" stored in the register 427 may be inputted to the second full adder 425. Both of the first and second full adders 424 and 425 may output a datum "0". Accordingly, the third full adder 426 may also output a datum "0". That is, the current total power consumption value PWRtotal may be "0" at the point of time that the first clock pulse t1 of the clock signal CLK is inputted to receive the write command WR for the first bank BANK1 of the first rank 111.

Figure 8:
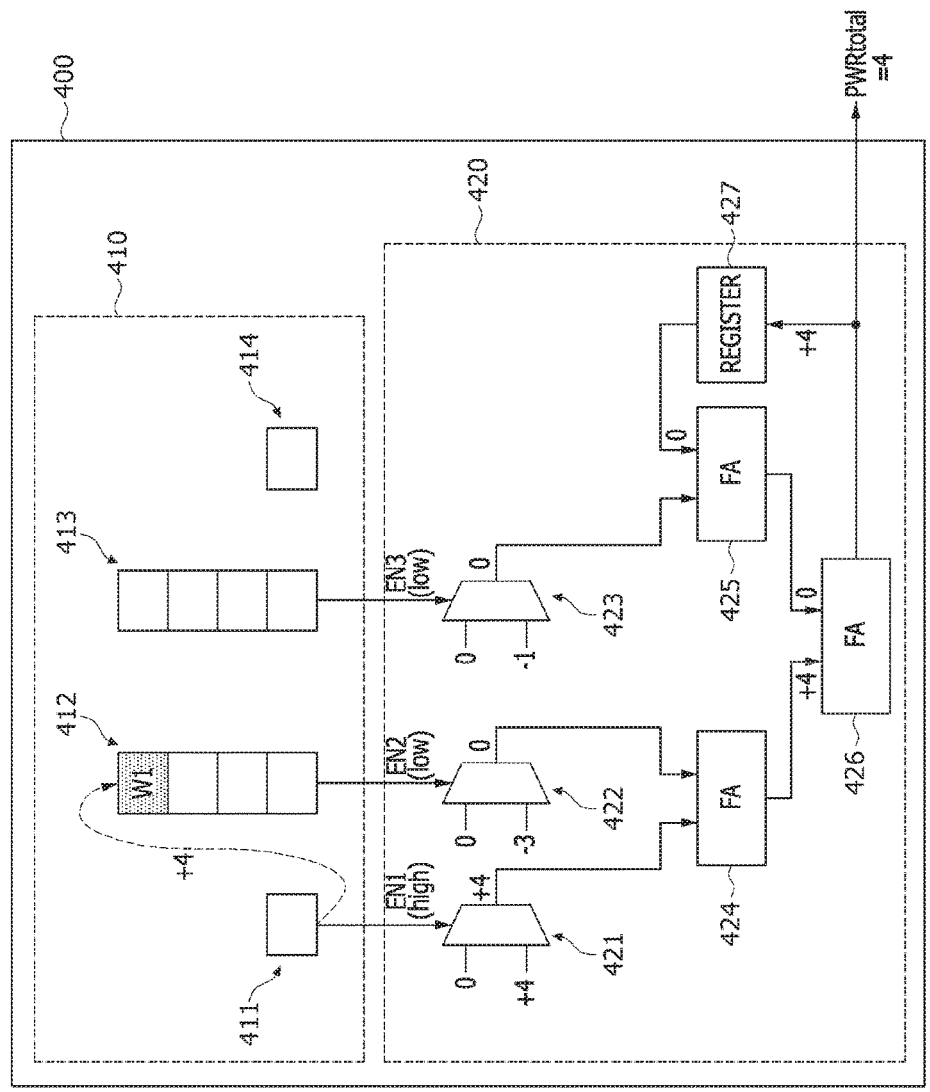

The write operation for storing data into the first bank BANK1 of the first rank 111 may be performed in synchronization with a second clock pulse t2 of the clock signal CLK, and the first datum W1 stored in the first pipeline 411 may be transmitted to the first storage element of the second pipeline 412. As the write operation starts, the power consumption value may increase to "4" and a deviation of the power consumption value may have a value of "+4" at a point of time that the second clock pulse t2 of the clock signal CLK is created. Thus, the total power consumption value PWRtotal may be "4" at the point of time that the second clock pulse t2 of the clock signal CLK is created. For example, at the point of time that the second clock pulse t2 is created, the first datum W1 stored in the first pipeline 411 may be transmitted to the first storage element of the second pipeline 412, as illustrated in FIG. 8. Thus, the first pipeline 411 may output the first enablement signal EN1 having a logic "high" level. In such a case, both of the second and third enablement signals EN2 and EN3 outputted from the second and third pipelines 412 and 413 may maintain a logic "low" level. Accordingly, the first multiplexer 421 may output a datum corresponding to a value of "+4", and both of the second and third multiplexers 422 and 423 may output a datum corresponding to a value of "0". Since an output datum of the third full adder 426 has a value of "0" at the point of time that the previous clock pulse (i.e., the first clock pulse t1) of the clock signal CLK is created, the datum "0" stored in the register 427 may be inputted to the second full adder 425. The first full adder 424 may output a datum "+4", and the second full adder 425 may output a datum "0". Thus, the third full adder 426 may output a datum "+4". That is, the total power consumption value PWRtotal may have a value of "4" at the point of time that the second clock pulse t2 of the clock signal CLK is inputted to start the write operation for storing data into the first bank BANK1 of the first rank 111.

If the write command WR for the second bank BANK2 included in the first rank 111 is inputted in synchronization with a third clock pulse t3 of the clock signal CLK, a second datum W2 may be inputted to the first pipeline 411. In such a case, since the write operation for the first bank BANK1 is performed too, the first datum W1 stored in the first storage element of the second pipeline 412 may be shifted into the second storage element of the second pipeline 412.

Figure 9:
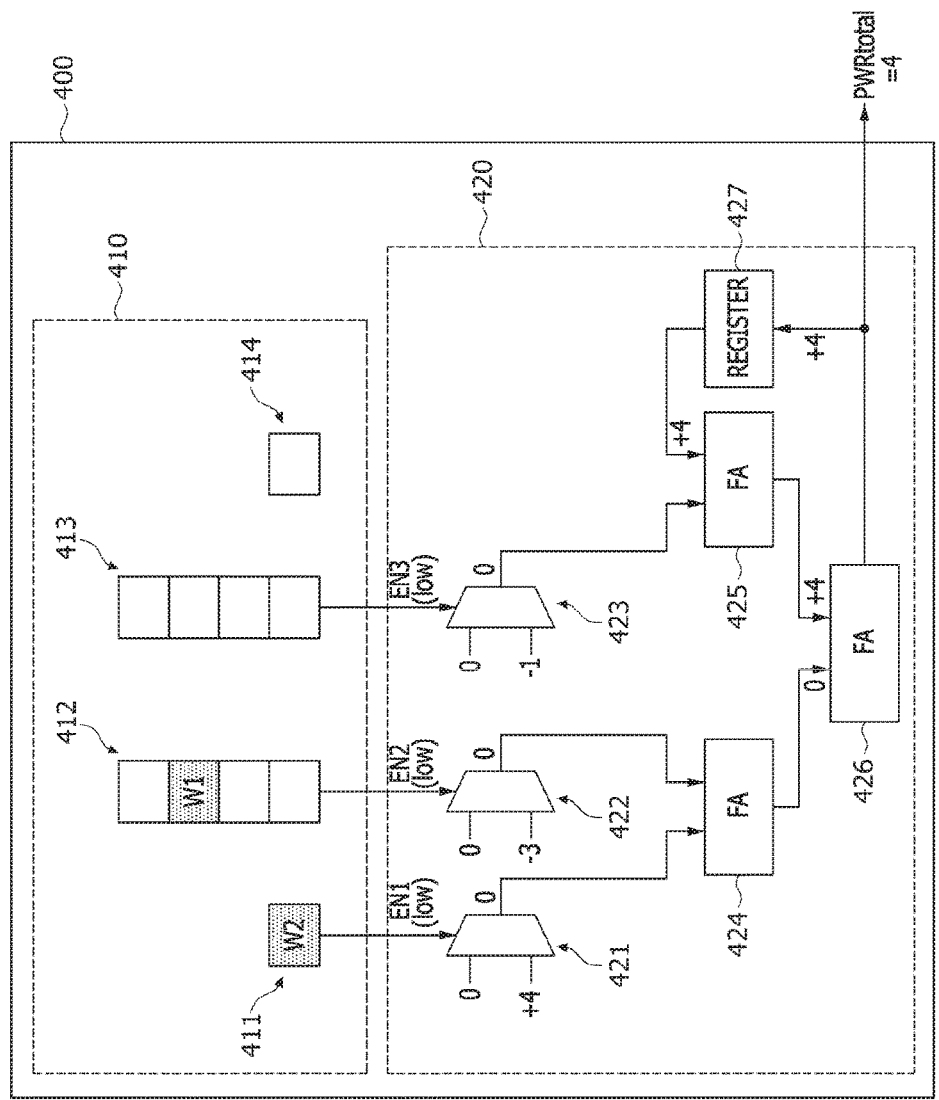

Referring to FIG. 9, since no data transmission between the first to fourth pipelines 411~414 occurs at the point of time that the third clock pulse t3 of the clock signal CLK is created, all of the first to third enablement signals EN1, EN2, and EN3 may have a logic "low" level. Thus, all of the first to third multiplexers 421, 422, and 423 may output a datum corresponding to a value of "0". Since an output datum of the third full adder 426 has a value of "+4" at the point of time that the previous clock pulse (i.e., the second clock pulse t2) of the clock signal CLK is created, the datum "+4" stored in the register 427 may be inputted to the second full adder 425. The first full adder 424 may output a datum "0", and the second full adder 425 may output a datum "+4". Thus, the third full adder 426 may output a datum "+4". That is, the total power consumption value PWRtotal may maintain a value of "4" at the point of time that the third clock pulse t3 of the clock signal CLK is inputted to perform the write operation for storing data into the first bank BANK1 of the first rank 111 and to receive the write command WR for the second bank BANK2 of the first rank 111.

Figure 10:
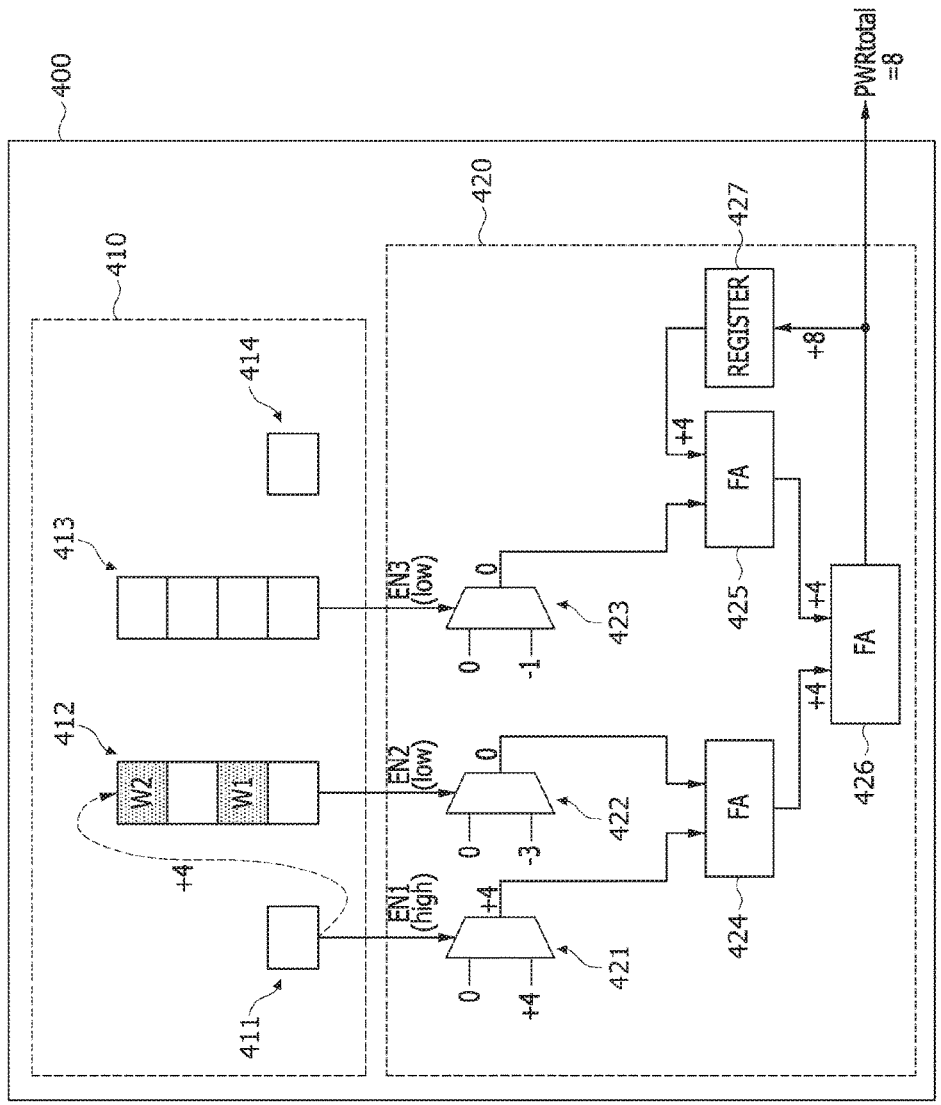

The write operation for storing data into the second bank BANK2 of the first rank 111 may be performed in synchronization with a fourth clock pulse t4 of the clock signal CLK, and the second datum W2 stored in the first pipeline 411 may be transmitted to the first storage element of the second pipeline 412. As the write operation for the second bank BANK2 of the first rank 111 starts, the power consumption value of the second bank BANK2 may increase to "4". Accordingly, a deviation of the power consumption values at the points of time that the third and fourth clock pulses t3 and t4 are created may have a value of "+4" due to the write operation of the second bank BANK2. Meanwhile, the power consumption of the first bank BANK1 may maintain a value of "4". Thus, the total power consumption value PWRtotal may be "8" at the point of time that the fourth clock pulse t4 of the clock signal CLK is created. For example, at the point of time that the fourth clock pulse t4 is created, the second datum W2 stored in the first pipeline 411 may be transmitted to the first storage element of the second pipeline 412, as illustrated in FIG. 10. Thus, the first pipeline 411 may output the first enablement signal EN1 having a logic "high" level. In such a case, both of the second and third enablement signals EN2 and EN3 outputted from the second and third pipelines 412 and 413 may maintain a logic "low" level. Accordingly, the first multiplexer 421 may output a datum corresponding to a value of "+4", and both of the second and third multiplexers 422 and 423 may output a datum corresponding to a value of "0". Since an output datum of the third full adder 426 has a value of "+4" at the point of time that the previous clock pulse (i.e., the third clock pulse t3) of the clock signal CLK is created, the datum "4" stored in the register 427 may be inputted to the second full adder 425. The first full adder 424 may output a datum "+4", and the second full adder 425 may output a datum "+4". Thus, the third full adder 426 may output a datum "+8". That is, the total power consumption value PWRtotal may have a value of "8" at the point of time that the fourth clock pulse t4 of the clock signal CLK is inputted to maintain the write operation for storing data into the first bank BANK1 of the first rank 111 and to start the write operation for the second bank BANK2 of the first rank 111.

Figure 11:
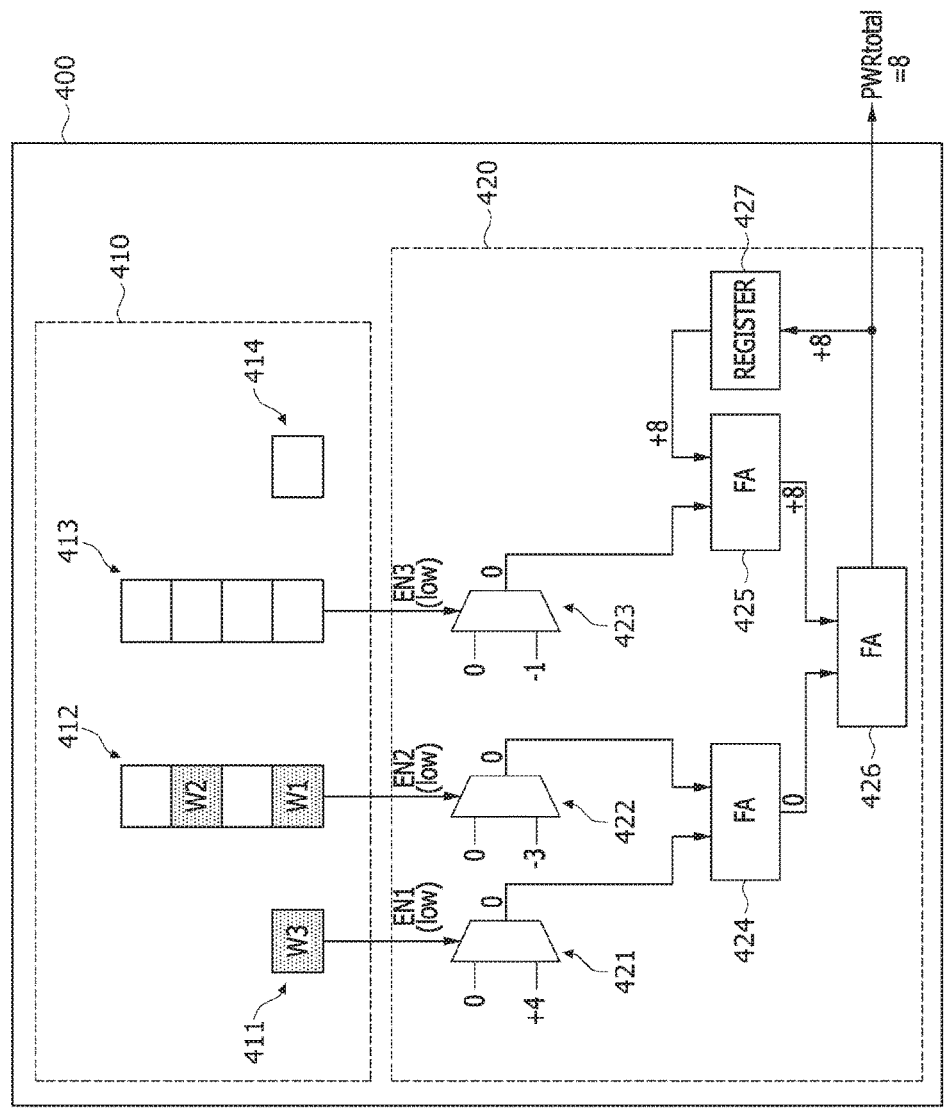

If the write command WR for the third bank BANK3 included in the first rank 111 is inputted in synchronization with a fifth clock pulse t5 of the clock signal CLK, a third datum W3 may be inputted to the first pipeline 411. In such a case, since the write operations for the first and second banks BANK1 and BANK2 are still performed, the first datum W1 stored in the third storage element of the second pipeline 412 may be shifted into the fourth storage element of the second pipeline 412 and the second datum W2 stored in the third storage element of the second pipeline 412 may be shifted into the second storage element of the second pipeline 412. Referring to FIG. 11, since no data transmission between the first to fourth pipelines 411~414 occurs at the point of time that the fifth clock pulse t5 of the clock signal CLK is created, all of the first to third enablement signals EN1, EN2, and EN3 may have a logic "low" level. Thus, all of the first to third multiplexers 421, 422, and 423 may output a datum corresponding to a value of "0". Since an output datum of the third full adder 426 has a value of "+8" at the point of time that the previous clock pulse (i.e., the fourth clock pulse t4) of the clock signal CLK is created, the datum "+8" stored in the register 427 may be inputted to the second full adder 425. The first full adder 424 may output a datum "0", and the second full adder 425 may output a datum "+8". Thus, the third full adder 426 may output a datum "+8". That is, the total power consumption value PWRtotal may maintain a value of "8" at the point of time that the fifth clock pulse t5 of the clock signal CLK is inputted to perform the write operation for storing data into the second bank BANK2 of the first rank 111 and to receive the write command WR for the third bank BANK3 of the first rank 111.

The write operation for storing data into the third bank BANK3 of the first rank 111 may be performed in synchronization with a sixth clock pulse t6 of the clock signal CLK, and the third datum W3 stored in the first pipeline 411 may be transmitted to the first storage element of the second pipeline 412. As the write operation for the third bank BANK3 of the first rank 111 starts, the power consumption value of the third bank BANK3 may increase to "4". Accordingly, a deviation between the power consumption values at the points of time that the fifth and sixth clock pulses t5 and t6 are created may have a value of "+4" due to the write operation of the third bank BANK3. Meanwhile, the power consumption value of the second bank BANK2 may maintain a value of "4". In contrast, while the write operation of the first bank BANK1 is performed, the first datum W1 stored in the fourth storage element of the second pipeline 412 may be transmitted to the first storage element of the third pipeline 413. At this point of time, the electric power consumed by the write operation of the first bank BANK1 may be reduced to have a value of "1", and a deviation of the electric power consumption may be negative three (−3). Thus, the total power consumption value PWRtotal may be "9" at the point of time that the sixth clock pulse t6 of the clock signal CLK is created.

Figure 12:
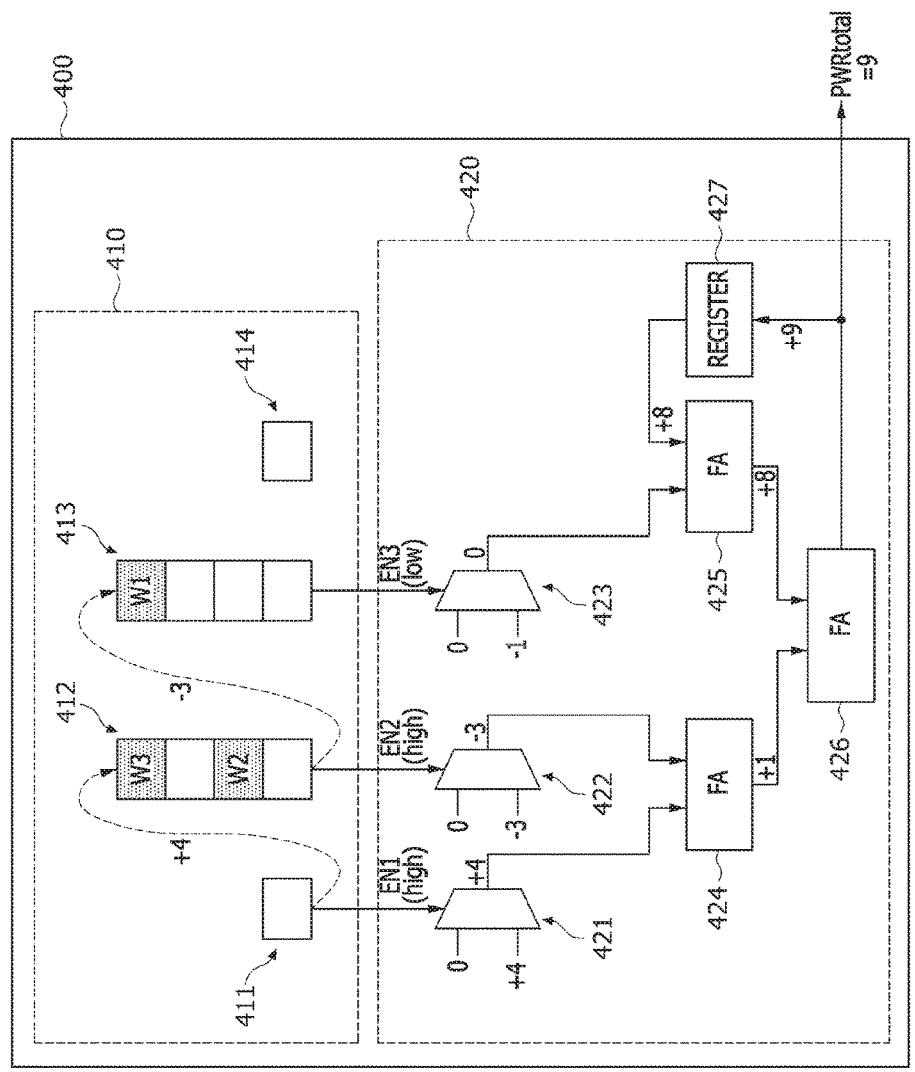

For example, at the point of time that the sixth clock pulse t6 is created, the third datum W3 stored in the first pipeline 411 may be transmitted to the second pipeline 412 and the first datum W1 stored in the second pipeline 412 may be transmitted to the third pipeline 413, as illustrated in FIG. 12. Thus, both of the first and second enablement signals EN1 and EN2 may have a logic "high" level, and the third enablement signal EN3 may maintain a logic "low" level. Accordingly, the first multiplexer 421 may output a datum corresponding to a value of "+4", and the second multiplexer 422 may output a datum corresponding to a value of "−3". The third multiplexer 423 may output a datum corresponding to a value of "0". Since an output datum of the third full adder 426 has a value of "+8" at the point of time that the previous clock pulse (i.e., the fifth clock pulse t5) of the clock signal CLK is created, the datum "+8" stored in the register 427 may be inputted to the second full adder 425. The first full adder 424 may output a datum "+1", and the second full adder 425 may output a datum "+8". Thus, the third full adder 426 may output a datum "+9". That is, the total power consumption value PWRtotal may have a value of "9" at the point of time that the sixth clock pulse t6 of the clock signal CLK is inputted to maintain the write operations for storing data into the first and second banks BANK1 and BANK2 of the first rank 111 and to start the write operation for the third bank BANK3 of the first rank 111.

Figure 13:
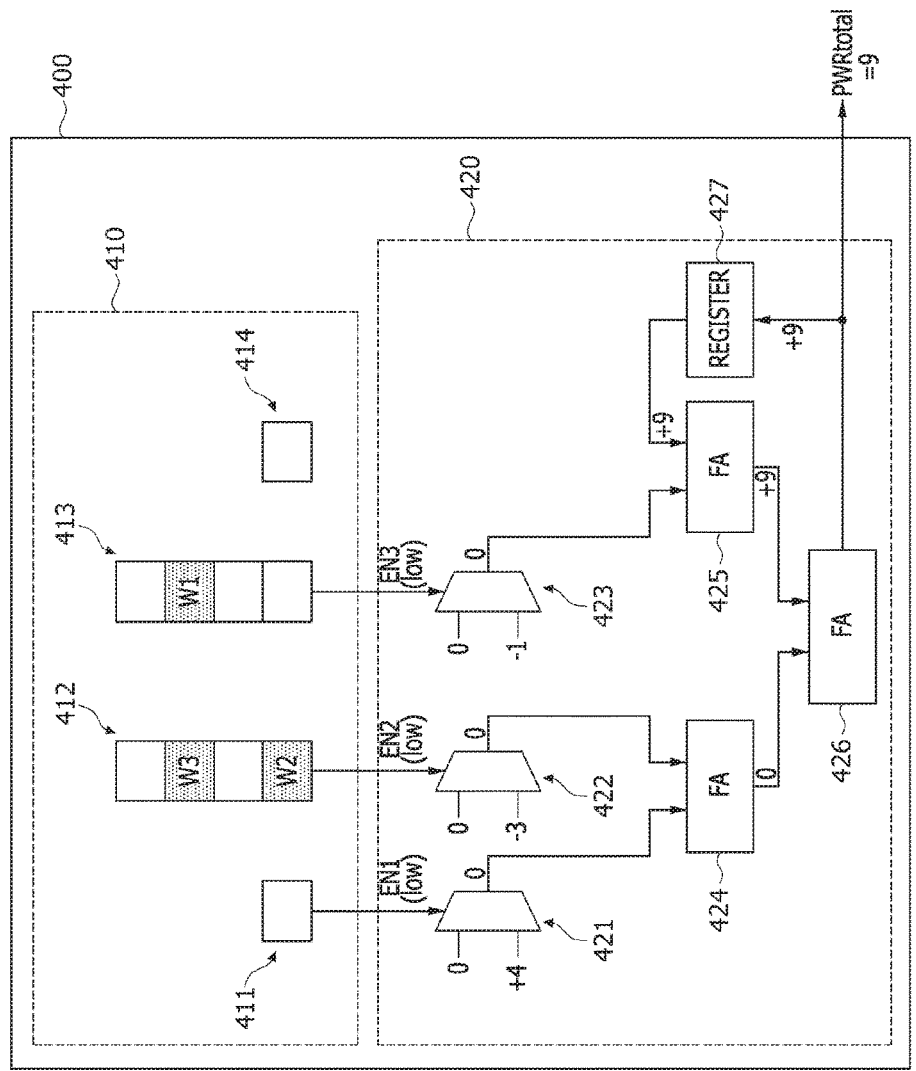

Since no write command WR is inputted in synchronization with a seventh clock pulse t7 of the clock signal CLK, no datum is inputted to the first pipeline 411. In such a case, the write operations for the first, second, and third banks BANK1, BANK2, and BANK3 may be continuously performed. Thus, the third datum W3 stored in the first storage element of the second pipeline 412 may be shifted to the second storage element of the second pipeline 412, and the second datum W2 stored in the third storage element of the second pipeline 412 may be shifted to the fourth storage element of the second pipeline 412. In addition, the first datum W1 stored in the first storage element of the third pipeline 413 may be shifted to the second storage element of the third pipeline 413. Referring to FIG. 13, since no data transmission between the first to fourth pipelines 411~414 occurs at the point of time that the seventh clock pulse t7 of the clock signal CLK is created, all of the first to third enablement signals EN1, EN2, and EN3 may have a logic "low" level. Thus, all of the first to third multiplexers 421, 422, and 423 may output a datum corresponding to a value of "0". Since an output datum of the third full adder 426 has a value of "+9" at the point of time that the previous clock pulse (i.e., the sixth clock pulse t6) of the clock signal CLK is created, the datum "+9" stored in the register 427 may be inputted to the second full adder 425. The first full adder 424 may output a datum "0", and the second full adder 425 may output a datum "+9". Thus, the third full adder 426 may output a datum "+9". That is, the total power consumption value PWRtotal may maintain a value of "9" at the point of time that the seventh clock pulse t7 of the clock signal CLK is inputted to perform the write operation for storing data into the first, second, and third banks BANK1, BANK2, and BANK3 of the first rank 111.

Figure 14:
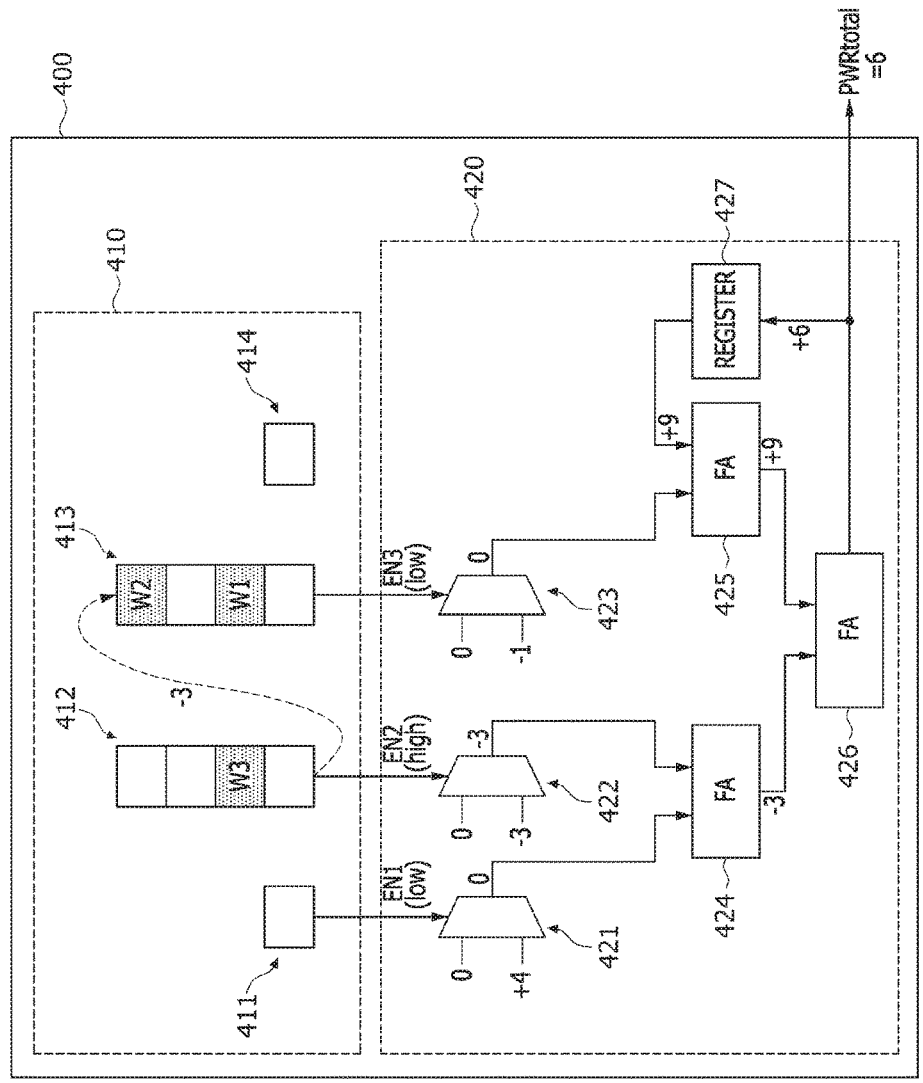

Since no write command WR is inputted in synchronization with an eighth clock pulse t8 of the clock signal CLK, no datum is inputted to the first pipeline 411. In such a case, the write operations for the first, second, and third banks BANK1, BANK2, and BANK3 may be continuously performed. Thus, the third datum W3 stored in the second storage element of the second pipeline 412 may be shifted to the third storage element of the second pipeline 412, and the second datum W2 stored in the fourth storage element of the second pipeline 412 may be transmitted to the first storage element of the third pipeline 413. In addition, the first datum W1 stored in the second storage element of the third pipeline 413 may be shifted to the third storage element of the third pipeline 413. Referring to FIG. 14, since the second datum W2 stored in the second pipeline 412 is transmitted to the third pipeline 413 at the point of time that the eighth clock pulse t8 of the clock signal CLK is created, the second enablement signal EN2 may have a logic "high" level, and both of the first and third enablement signals EN1 and EN3 may have a logic "low" level. Thus, both of the first and third multiplexers 421 and 423 may output a datum corresponding to a value of "0", and the second multiplexer 422 may output a datum corresponding to a value of "−3". Since an output datum of the third full adder 426 has a value of "+9" at the point of time that the previous clock pulse (i.e., the seventh clock pulse t7) of the clock signal CLK is created, the datum "+9" stored in the register 427 may be inputted to the second full adder 425. The first full adder 424 may output a datum "−3", and the second full adder 425 may output a datum "+9". Thus, the third full adder 426 may output a datum "+6". That is, the total power consumption value PWRtotal may be reduced to a value of "6" at the point of time that the eighth clock pulse t8 of the clock signal CLK is inputted to perform the write operation for storing data into the first, second, and third banks BANK1, BANK2, and BANK3 of the first rank 111.

Figure 15:
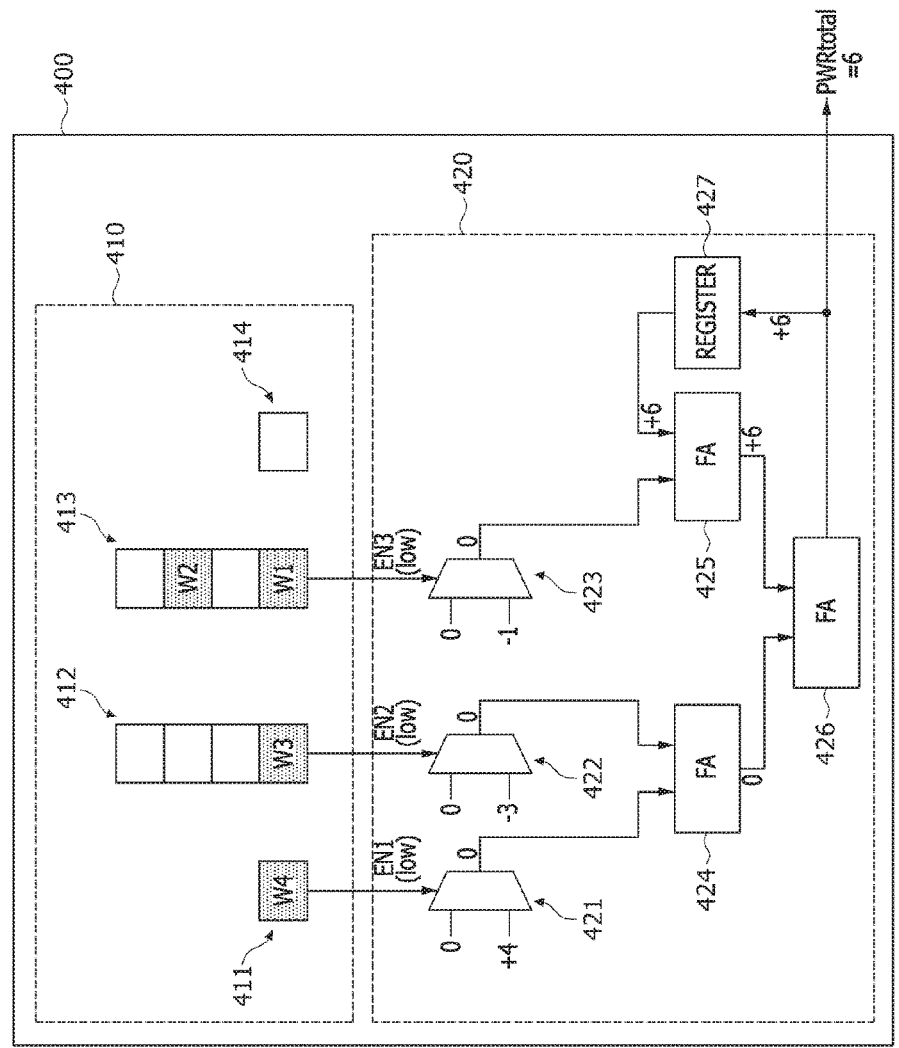

If the write command WR for the fourth bank BANK4 included in the first rank 111 is inputted in synchronization with a ninth clock pulse t9 of the clock signal CLK, a fourth datum W4 may be inputted to the first pipeline 411 and the write operations for the first to third banks BANK1, BANK2, and BANK3 may be continuously performed. Accordingly, the third datum W3 stored in the third storage element of the second pipeline 412 may be shifted to the fourth element of the second pipeline 412, and the second datum W2 stored in the first storage element of the third pipeline 413 may be shifted into the second storage element of the third pipeline 413. In addition, the first datum W1 stored in the third storage element of the third pipeline 413 may be shifted into the fourth storage element of the third pipeline 413. Referring to FIG. 15, since no data transmission between the first to fourth pipelines 411~414 occurs at the point of time that the ninth clock pulse t9 of the clock signal CLK is created, all of the first to third enablement signals EN1, EN2 and EN3 may have a logic "low" level. Thus, all of the first to third multiplexers 421, 422, and 423 may output a datum corresponding to a value of "0". Since an output datum of the third full adder 426 has a value of "+6" at the point of time that the previous clock pulse (i.e., the eighth clock pulse t8) of the clock signal CLK is created, the datum "+6" stored in the register 427 may be inputted to the second full adder 425. The first full adder 424 may output a datum "0", and the second full adder 425 may output a datum "+6". Thus, the third full adder 426 may output a datum "+6". That is, the total power consumption value PWRtotal may maintain a value of "6" at the point of time that the ninth clock pulse t9 of the clock signal CLK is inputted to perform the write operations for storing data into the first to third banks BANK1, BANK2, and BANK3 of the first rank 111 and to receive the write command WR for the fourth bank BANK4 of the first rank 111.

Since no write command WR is inputted in synchronization with a tenth clock pulse t10 of the clock signal CLK, no datum is inputted to the first pipeline 411. In such a case, the write operations for the first, second and third banks BANK1, BANK2, and BANK3 may be continuously performed, and the write operation for the fourth bank BANK4 may start. Since the tenth clock pulse t10 is inputted after eighth clock pulses are created from the point of time that the second clock pulse t2 is inputted to start the write operation for the first bank BANK1, no electric power may be consumed by the write operation for the first bank BANK1 from the point of time that the tenth clock pulse t10 is inputted, as described with reference to FIG. 4. The fourth data W4 stored in the first pipeline 411 may be transmitted to the first storage element of the second pipeline 412, and the third datum W3 stored in the fourth storage element of the second pipeline 412 may be transmitted to the first storage element of the third pipeline 413. In addition, the second datum W2 stored in the second storage element of the third pipeline 413 may be shifted to the third storage element of the third pipeline 413, and the first datum W1 stored in the fourth storage element of the third pipeline 413 may be transmitted to the fourth pipeline 414.

Figure 16:
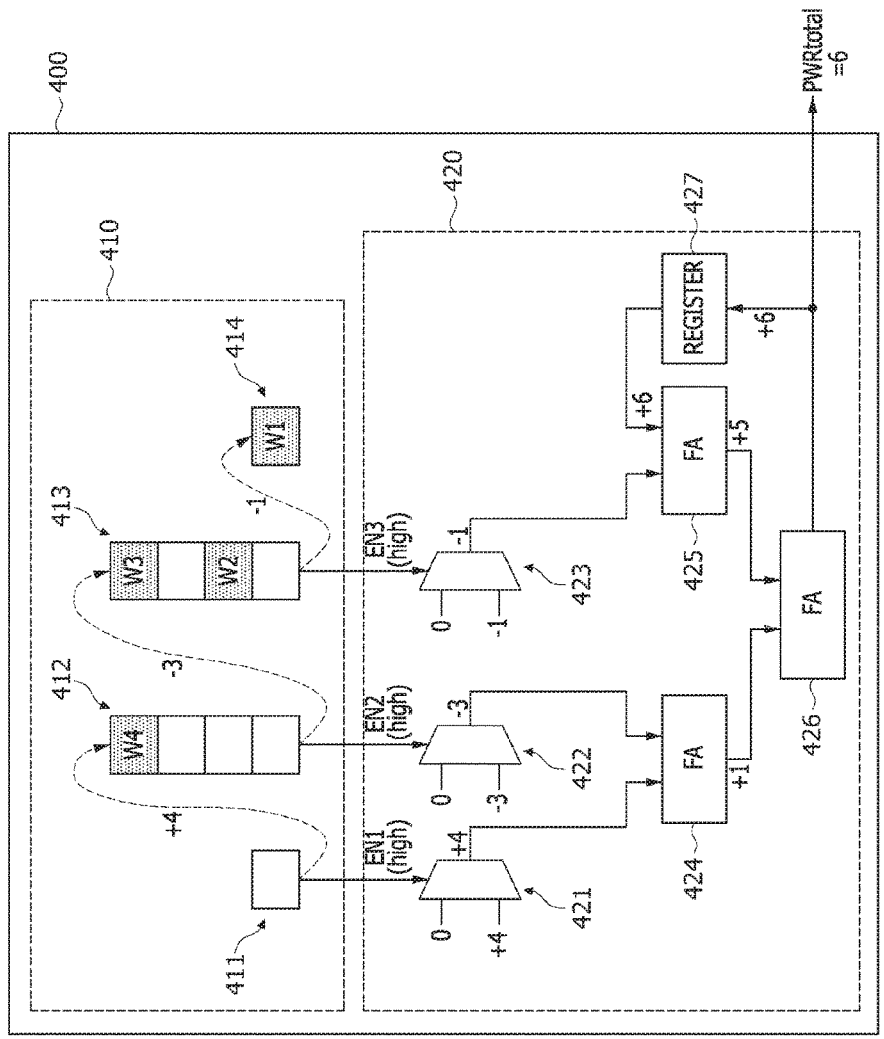

Referring to FIG. 16, since the data are transmitted between the first to fourth pipelines 411, 412, 413, and 414 at the point of time that the tenth clock pulse t10 of the clock signal CLK is created, all of the first to third enablement signals EN1, EN2, and EN3 may have a logic "high" level. Thus, the first multiplexer 421 may output a datum corresponding to a value of "+4", the second multiplexer 422 may output a datum corresponding to a value of "−3", and the third multiplexer 423 may output a datum corresponding to a value of "−1". Since an output datum of the third full adder 426 has a value of "+6" at the point of time that the previous clock pulse (i.e., the ninth clock pulse t9) of the clock signal CLK is created, the datum "+6" stored in the register 427 may be inputted to the second full adder 425. The first full adder 424 may output a datum "+1", and the second full adder 425 may output a datum "+5". Thus, the third full adder 426 may output a datum "+6". That is, the total power consumption value PWRtotal may maintain a value of "6" at the point of time that the tenth clock pulse t10 of the clock signal CLK is inputted to perform the write operations for storing data into the first, second, and third banks BANK1, BANK2, and BANK3 of the first rank 111 and to start the write operation for the fourth bank BANK4 of the first rank 111.

Since no write command WR is inputted in synchronization with an eleventh clock pulse t11 of the clock signal CLK, no datum is inputted to the first pipeline 411. In such a case, the write operations for the second, third, and fourth banks BANK2, BANK3, and BANK4 may be performed. The fourth data W4 stored in the first storage element of the second pipeline 412 may be shifted to the second storage element of the second pipeline 412, and the third datum W3 stored in the first storage element of the third pipeline 413 may be shifted to the second storage element of the third pipeline 413. In addition, the second datum W2 stored in the third storage element of the third pipeline 413 may be shifted to the fourth storage element of the third pipeline 413.

Figure 17:
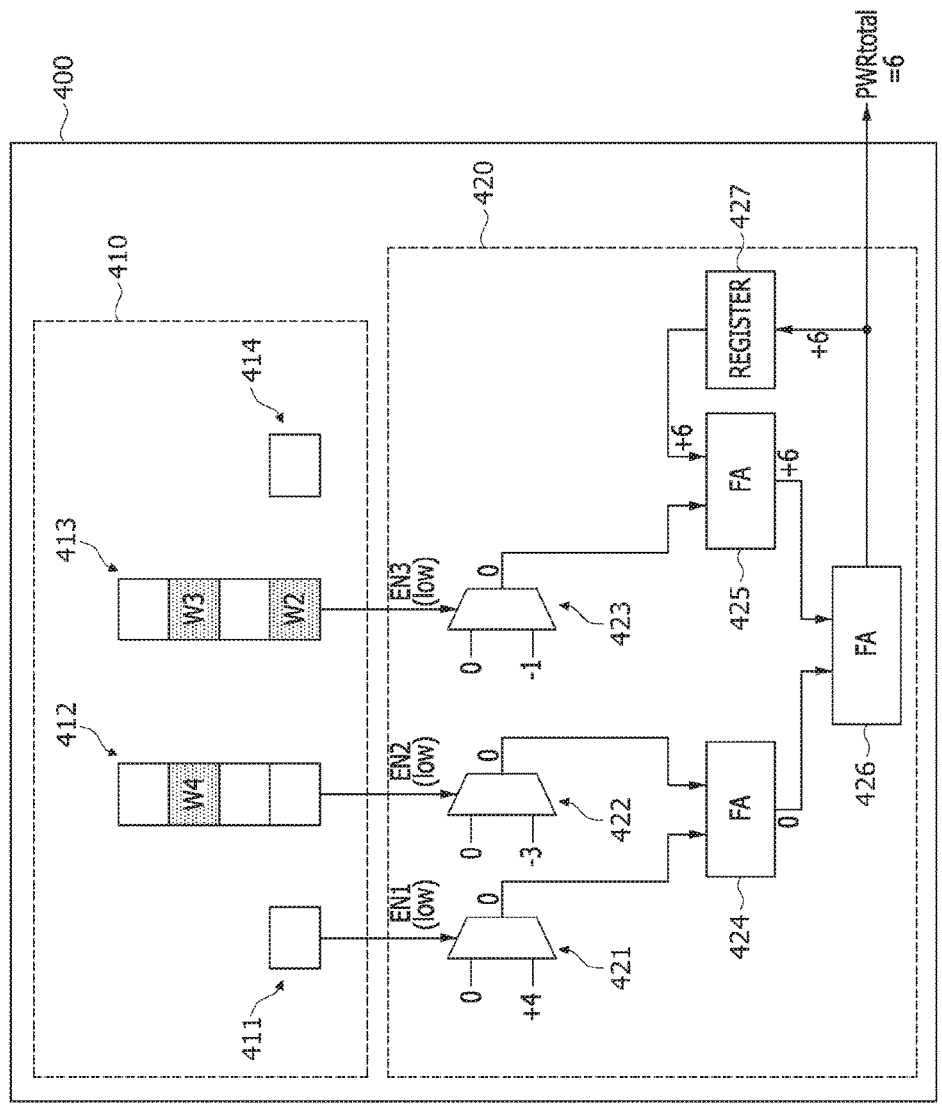

Referring to FIG. 17, since no data transmission between the first to fourth pipelines 411~414 occurs at the point of time that the eleventh clock pulse t11 of the clock signal CLK is created, all of the first to third enablement signals EN1, EN2, and EN3 may have a logic "low" level. Thus, all of the first to third multiplexers 421, 422, and 423 may output a datum corresponding to a value of "0". Since an output datum of the third full adder 426 has a value of "+6" at the point of time that the previous clock pulse (i.e., the tenth clock pulse t10) of the clock signal CLK is created, the datum "+6" stored in the register 427 may be inputted to the second full adder 425. The first full adder 424 may output a datum "0", and the second full adder 425 may output a datum "+6". Thus, the third full adder 426 may output a datum "+6". That is, the total power consumption value PWRtotal may maintain a value of "6" at the point of time that the eleventh clock pulse t11 of the clock signal CLK is inputted to perform the write operations for storing data into the second to fourth banks BANK2, BANK3, and BANK4 of the first rank 111.

Since no write command WR is inputted in synchronization with a twelfth clock pulse t12 of the clock signal CLK, no datum is inputted to the first pipeline 411. In such a case, the write operations for the third and fourth banks BANK3 and BANK4 may be continuously performed. Since the twelfth clock pulse t12 is inputted after eighth clock pulses are created from the point of time that the fourth clock pulse t4 is inputted to start the write operation for the second bank BANK2, no electric power may be consumed by the write operation for the second bank BANK2 from the point of time that the twelfth clock pulse t12 is inputted, as described with reference to FIG. 4. The fourth data W4 stored in the second storage element of the second pipeline 412 may be shifted to the third storage element of the second pipeline 412, and the third datum W3 stored in the second storage element of the third pipeline 413 may be shifted to the third storage element of the third pipeline 413. In addition, the second datum W2 stored in the fourth storage element of the third pipeline 413 may be transmitted to the fourth pipeline 414.

Figure 18:
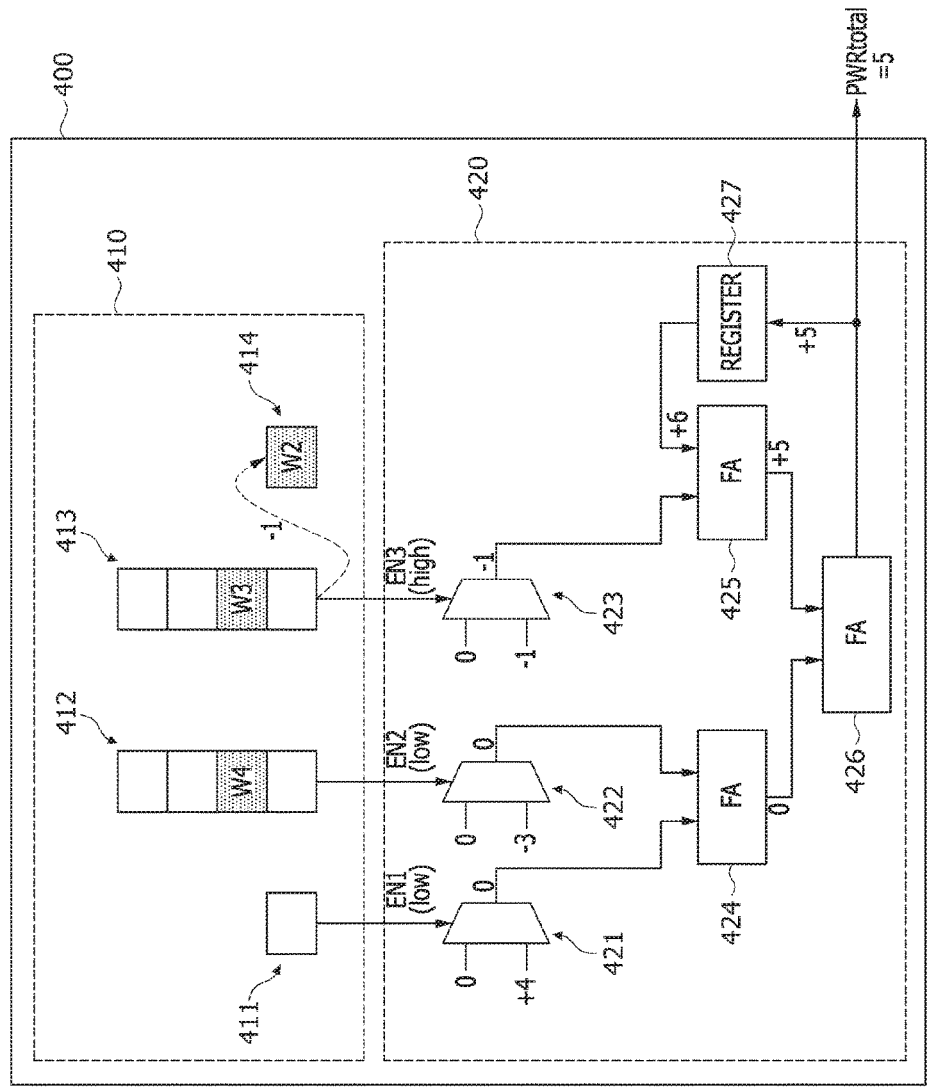

Referring to FIG. 18, since the data transmission between the third and fourth pipelines 413 and 414 occurs at the point of time that the twelfth clock pulse t12 of the clock signal CLK is created, the third enablement signal EN3 may have a logic "high" level while both of the first and second enablement signals EN1 and EN2 may have a logic "low" level. Thus, the first multiplexer 421 may output a datum corresponding to a value of "0", the second multiplexer 422 may output a datum corresponding to a value of "0", and the third multiplexer 423 may output a datum corresponding to a value of "−1". Since an output datum of the third full adder 426 has a value of "+6" at the point of time that the previous clock pulse (i.e., the eleventh clock pulse t11) of the clock signal CLK is created, the datum "+6" stored in the register 427 may be inputted to the second full adder 425. The first full adder 424 may output a datum "0", and the second full adder 425 may output a datum "+5". Thus, the third full adder 426 may output a datum "+5". That is, the total power consumption value PWRtotal may be reduced to a value of "5" at the point of time that the twelfth clock pulse t12 of the clock signal CLK is inputted to perform the write operations for storing data into the third and fourth banks BANK3 and BANK4 of the first rank 111.

Since no write command WR is inputted in synchronization with a thirteenth clock pulse t13 of the clock signal CLK, no datum is inputted to the first pipeline 411. In such a case, the write operations for the third and fourth banks BANK3 and BANK4 may be performed. The fourth data W4 stored in the third storage element of the second pipeline 412 may be shifted to the fourth storage element of the second pipeline 412, and the third datum W3 stored in the third storage element of the third pipeline 413 may be shifted to the fourth storage element of the third pipeline 413.

Figure 19:
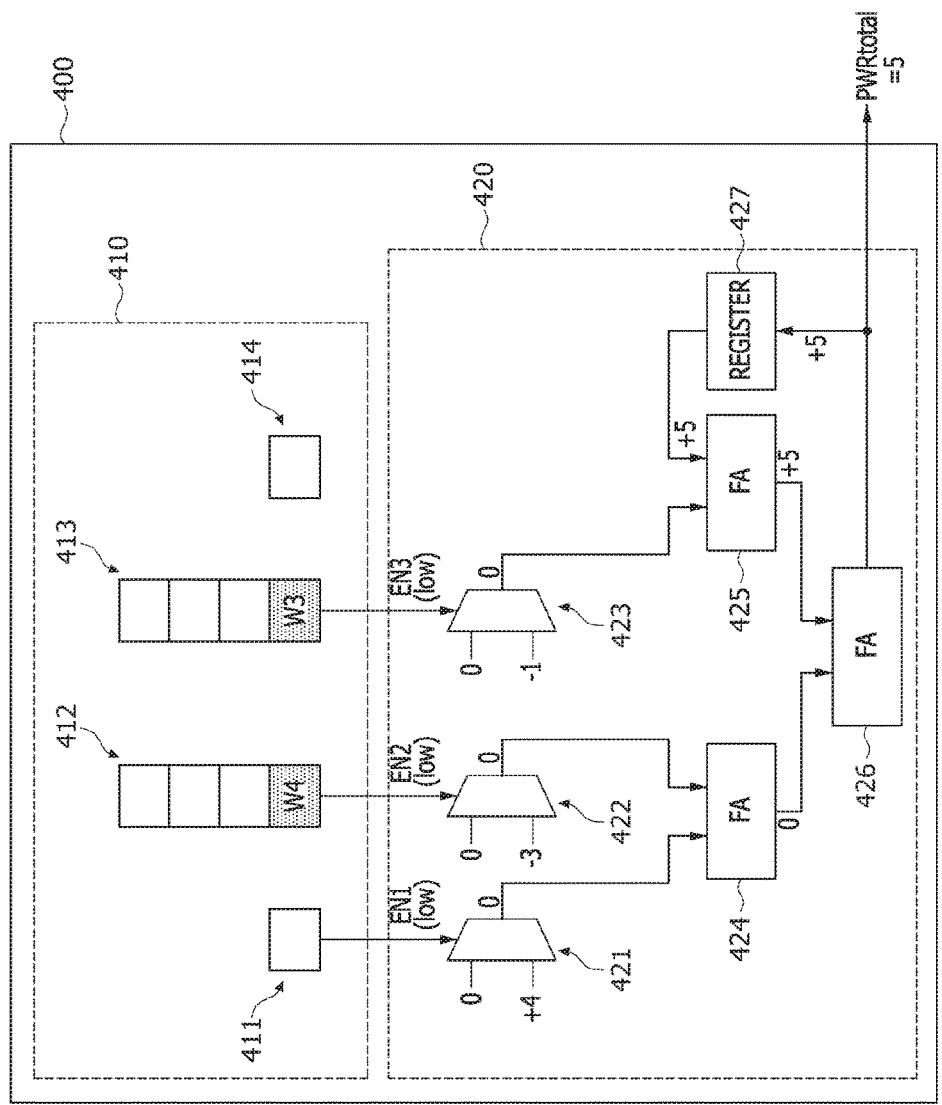

Referring to FIG. 19, since no data transmission between the first to fourth pipelines 411~414 occurs at the point of time that the thirteenth clock pulse t13 of the clock signal CLK is created, all of the first to third enablement signals EN1, EN2, and EN3 may have a logic "low" level. Thus, all of the first to third multiplexers 421, 422 and 423 may output a datum corresponding to a value of "0". Since an output datum of the third full adder 426 has a value of "+5" at the point of time that the previous clock pulse (i.e., the twelfth clock pulse t12) of the clock signal CLK is created, the datum "+5" stored in the register 427 may be inputted to the second full adder 425. The first full adder 424 may output a datum "0", and the second full adder 425 may output a datum "+5". Thus, the third full adder 426 may output a datum "+5". That is, the total power consumption value PWRtotal may maintain a value of "5" at the point of time that the thirteenth clock pulse t13 of the clock signal CLK is inputted to perform the write operations for storing data into the third and fourth banks BANK3 and BANK4 of the first rank 111.

Since no write command WR is inputted in synchronization with a fourteenth clock pulse t14 of the clock signal CLK, no datum is inputted to the first pipeline 411. In such a case, the write operation for the fourth bank BANK4 may be continuously performed. Since the fourteenth clock pulse t14 is inputted after eighth clock pulses are created from the point of time that the sixth clock pulse t6 is inputted to start the write operation for the third bank BANK3, no electric power may be consumed by the write operation for the third bank BANK3 from the point of time that the fourteenth clock pulse t14 is inputted, as described with reference to FIG. 4. The fourth data W4 stored in the fourth storage element of the second pipeline 412 may be transmitted to the first storage element of the third pipeline 413, and the third datum W3 stored in the fourth storage element of the third pipeline 413 may be transmitted to the fourth pipeline 414.

Figure 20:
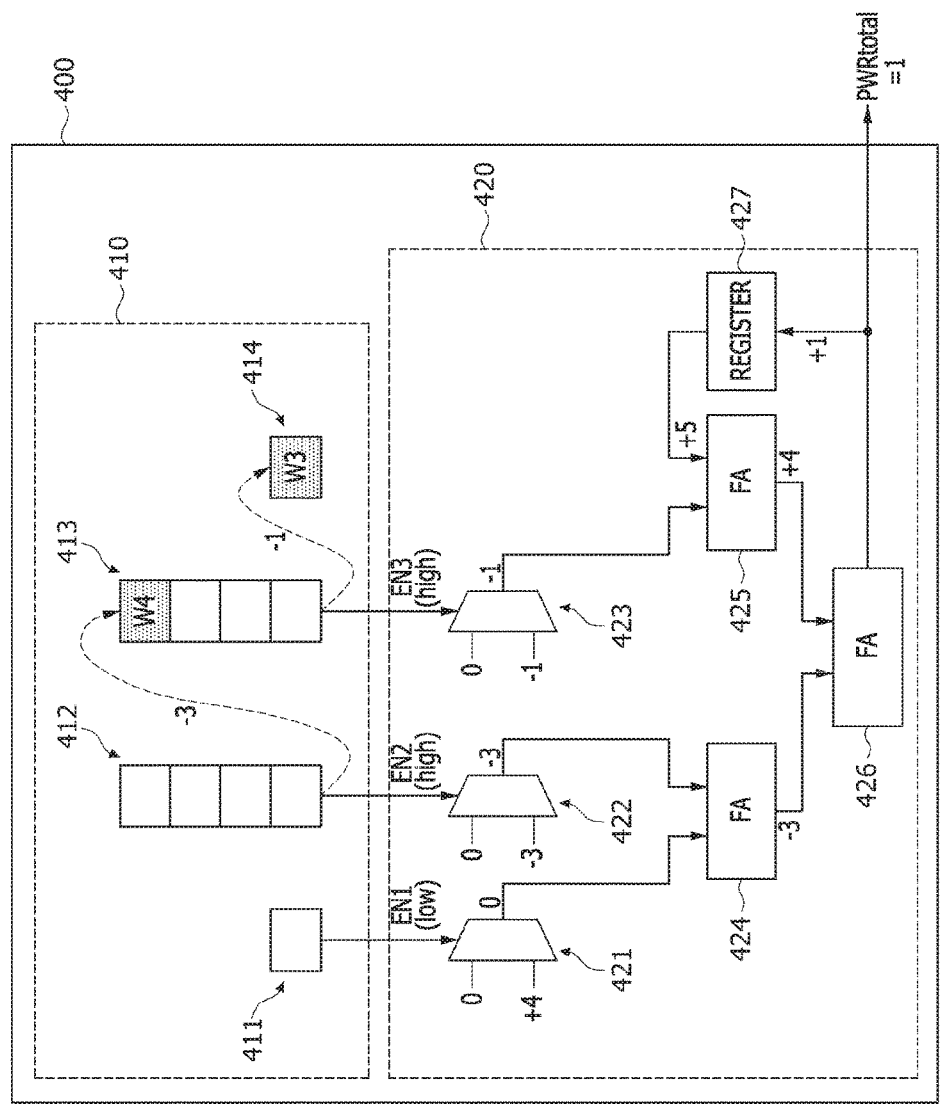

Referring to FIG. 20, since the data transmission between the second to fourth pipelines 412, 413, and 414 occurs at the point of time that the fourteenth clock pulse t14 of the clock signal CLK is created, the second and third enablement signals EN2 and EN3 may have a logic "high" level while the first enablement signal EN1 may have a logic "low" level. Thus, the first multiplexer 421 may output a datum corresponding to a value of "0", the second multiplexer 422 may output a datum corresponding to a value of "−3", and the third multiplexer 423 may output a datum corresponding to a value of "−1". Since an output datum of the third full adder 426 has a value of "+5" at the point of time that the previous clock pulse (i.e., the thirteenth clock pulse t13) of the clock signal CLK is created, the datum "+5" stored in the register 427 may be inputted to the second full adder 425. The first full adder 424 may output a datum "−3", and the second full adder 425 may output a datum "+4". Thus, the third full adder 426 may output a datum "+1". That is, the total power consumption value PWRtotal may be reduced to a value of "1" at the point of time that the fourteenth clock pulse t14 of the clock signal CLK is inputted to perform the write operation for storing data into the fourth bank BANK4 of the first rank 111.

Since no write command WR is inputted in synchronization with fifteenth to seventeenth clock pulses t15, t16, and t17 of the clock signal CLK, no datum is inputted to the first pipeline 411. While the fifteenth to seventeenth clock pulses t15, t16, and t17 of the clock signal CLK are created, the write operation for the fourth bank BANK4 may be continuously performed. Therefore, the fourth datum W4 stored in the first storage element of the third pipeline 413 may be shifted to the fourth storage element of the third pipeline 413 through the second and third storage elements of the third pipeline 413, in synchronization with the fifteenth to seventeenth clock pulses t15, t16, and t17 of the clock signal CLK.

The fourth datum W4 stored in the fourth storage element of the third pipeline 413 may be transmitted to the storage element of the fourth pipeline 414 in synchronization with an eighteenth clock pulse t18 of the of the clock signal CLK. Since the eighteenth clock pulse t18 is inputted after eighth clock pulses are created from the point of time that the tenth clock pulse t10 is inputted to start the write operation for the fourth bank BANK4, no electric power may be consumed by the write operation for the fourth bank BANK4 from the point of time that the eighteenth clock pulse t18 is inputted, as described with reference to FIG. 4.

Figure 21:
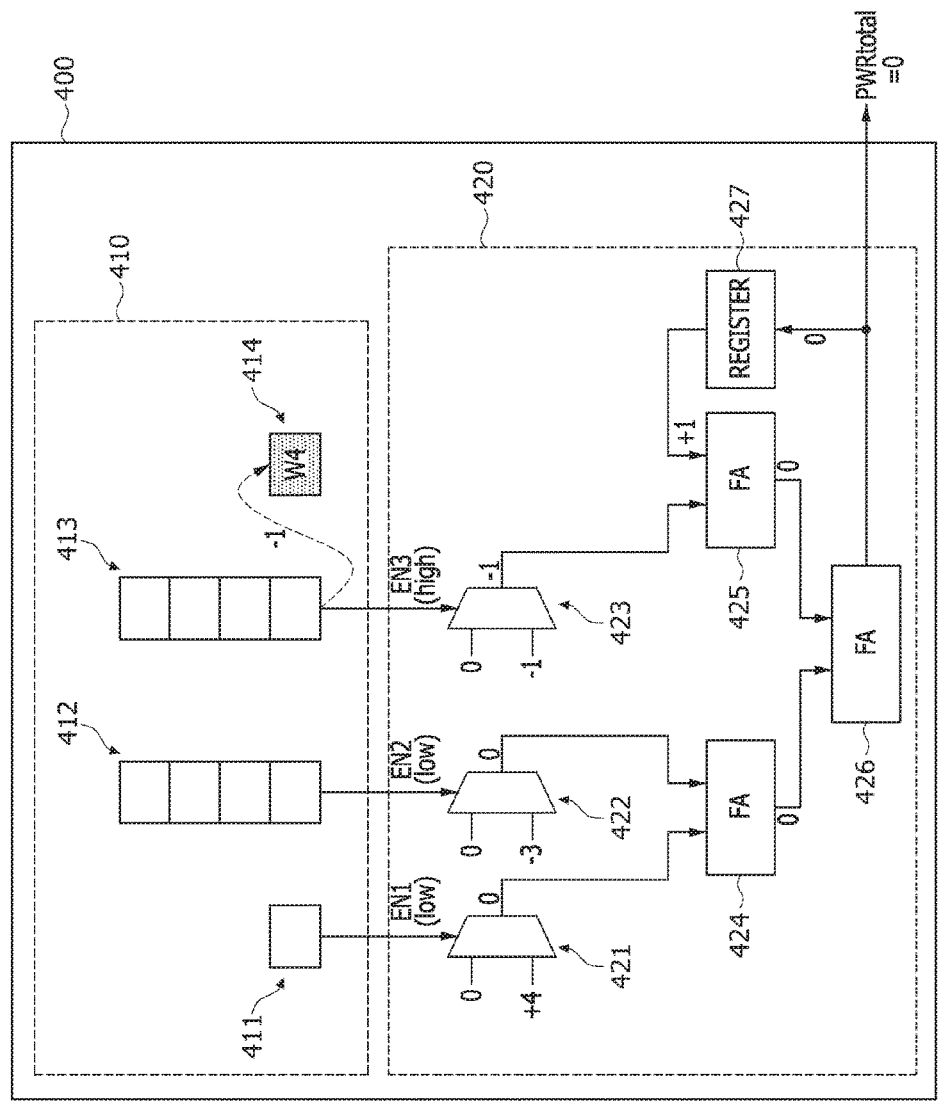

Referring to FIG. 21, since the data transmission between the third and fourth pipelines 413 and 414 occurs at the point of time that the eighteenth clock pulse t18 of the clock signal CLK is created, the third enablement signal EN3 may have a logic "high" level while the first and second enablement signals EN1 and EN2 may have a logic "low" level. Thus, the first multiplexer 421 may output a datum corresponding to a value of "0", the second multiplexer 422 may output a datum corresponding to a value of "0", and the third multiplexer 423 may output a datum corresponding to a value of "−1". Since an output datum of the third full adder 426 has a value of "+1" at the points of time that the previous clock pulses (i.e., the fifteenth to seventeenth clock pulses t15, t16, and t17) of the clock signal CLK are created, the datum "+1" stored in the register 427 may be inputted to the second full adder 425. The first full adder 424 may output a datum "0", and the second full adder 425 may output a datum "0". Thus, the third full adder 426 may output a datum "0". Accordingly, the total power consumption value PWRtotal may be zero at the point of time that the eighteenth clock pulse t18 of the clock signal CLK is created.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. A circuit for calculating power consumption of a phase change memory (PCM) device, the circuit comprising:
   a plurality of pipelines configured to correspond to a plurality of write periods exhibiting different power consumption values during a write operation of the PCM device executed by a write command and configured to shift or transmit data in synchronization with a clock signal; and
   an arithmetic logic circuit configured to generate a total power consumption value by performing an adding operation of all of deviations of the power consumption values at a point of time that data transmission between at least two of the plurality of pipelines occurs.

2. The circuit of claim 1, wherein the plurality of write periods include a first write period exhibiting a first power consumption value, a second write period exhibiting a second power consumption value which is less than the first power consumption value, and a third write period without any power consumption.

3. The circuit of claim 2, wherein the plurality of pipelines includes:
   a first pipeline configured to have a single storage element;
   a second pipeline configured to have a plurality of storage elements corresponding to the first write period;
   a third pipeline configured to have a plurality of storage elements corresponding to the second write period; and
   a fourth pipeline configured to have a single storage element.

4. The circuit of claim 3,
   wherein the clock signal includes a plurality of clock pulses;
   wherein the single storage element of the first pipeline corresponds to an input period of the write command;
   wherein the second pipeline has the same number of storage elements as the clock pulses which are created during the first write period; and
   wherein the third pipeline has the same number of storage elements as the clock pulses which are created during the second write period.

5. The circuit of claim 3, wherein a datum is stored into the single storage element of the first pipeline if the write command is inputted in synchronization with a first clock pulse of the clock signal.

6. The circuit of claim 5,
   wherein the datum stored in the single storage element of the first pipeline is transmitted to a first storage element of the second pipeline in synchronization with a second clock pulse of the clock signal;
   wherein the datum stored in the first storage element of the second pipeline is shifted to a last storage element of the second pipeline through the storage elements between the first to last storage elements of the second pipeline in synchronization with third clock pulses sequentially created after the second clock pulse of the clock signal;
   wherein the datum stored in the last storage element of the second pipeline is transmitted to a first storage element of the third pipeline in synchronization with a fourth clock pulse of the clock signal;
   wherein the datum stored in the first storage element of the third pipeline is shifted to a last storage element of the third pipeline through the storage elements between the first to last storage elements of the third pipeline in synchronization with fifth clock pulses sequentially created after the fourth clock pulse of the clock signal; and
   wherein the datum stored in the last storage element of the third pipeline is transmitted to the single storage element of the fourth pipeline in synchronization with a sixth clock pulse created after the fifth clock pulses of the clock signal.

7. The circuit of claim 3,
   wherein the first pipeline generates a first enablement signal, a level of the first enablement signal changing from a first level into a second level at a point of time that a datum is transmitted from the first pipeline to the second pipeline;
   wherein the second pipeline generates a second enablement signal, a level of the second enablement signal changing from the first level into the second level at a point of time that a datum is transmitted from the second pipeline to the third pipeline; and
   wherein the third pipeline generates a third enablement signal, a level of the third enablement signal changing from the first level into the second level at a point of time that a datum is transmitted from the third pipeline to the fourth pipeline.

8. The circuit of claim 1, wherein each of the plurality of pipelines is realized by including a shift register.

9. The circuit of claim 1, wherein arithmetic logic circuit incudes:
   a plurality of multiplexers configured to output the deviations of the power consumption values in synchronization with the clock signal when data transmission between the pipelines occurs;
   a full adder portion configured to perform an adding operation of output data of the plurality of multiplexers and a previous total power consumption value generated at a point of time that a previous clock pulse of the clock signal is created, and configured to output the result of the adding operation as a current total power consumption value generated at a point of time that a current clock pulse of the clock signal is created; and
   a register configured to store the current total power consumption value and configured to send the current total power consumption value to the full adder portion at a point of time that a next clock pulse of the clock signal is created.

10. The circuit of claim 9,
wherein the plurality of pipelines include a first pipeline having a single storage element, a second pipeline having a plurality of storage elements corresponding to a first write period exhibiting a first power consumption value during the write operation, a third pipeline having a plurality of storage elements corresponding to a second write period exhibiting a second power consumption value less than the first power consumption value during the write operation, and a fourth pipeline having a single storage element corresponding to a third write period; and
wherein the plurality of multiplexers include:
a first multiplexer configured to output the first power consumption value as a deviation of the first power consumption value in synchronization with the clock signal causing a data transmission from the first pipeline into the second pipeline and configured to output a datum corresponding to a value of "0" if no data transmission between the first and second pipelines occurs;
a second multiplexer configured to output a value remaining after subtracting the first power consumption value from the second power consumption value as a deviation of the second power consumption value in synchronization with the clock signal causing a data transmission from the second pipeline into the third pipeline and configured to output a datum corresponding to a value of "0" if no data transmission between the second and third pipelines occurs; and
a third multiplexer configured to output a value remaining after subtracting the second power consumption value from a value of zero as a deviation of the third power consumption value in synchronization with the clock signal causing a data transmission from the third pipeline into the fourth pipeline and configured to output a datum corresponding to a value of "0" if no data transmission between the third and fourth pipelines occurs.

11. The circuit of claim 10, wherein the full adder portion includes:
a first full adder configured to perform a first adding operation of an output datum of the first multiplexer and an output datum of the second multiplexer to output the result of the first adding operation;
a second full adder configured to perform a second adding operation of an output datum of the third multiplexer and an output datum of the register to output the result of the second adding operation; and
a third full adder configured to perform a third adding operation of an output datum of the first full adder and an output datum of the second full adder to output the result of the third adding operation.

12. A phase change memory (PCM) system comprising:
a PCM device configured to store data therein during a plurality of write periods exhibiting different power consumption values while a write operation is performed by a write command; and
a memory controller configured to control the write operation of the PCM device according to a request received by the memory controller,
wherein the memory controller is configured to generate a total power consumption value by including a plurality of pipelines configured to correspond to the plurality of write periods to shift or transmit data in synchronization with a clock signal and an arithmetic logic circuit configured to perform an adding operation of all of deviations of power consumption values at a point of time that data transmission between at least two of the plurality of pipelines occurs.

13. The PCM system of claim 12, wherein the PCM device includes a plurality of banks.

14. The PCM system of claim 12, wherein the plurality of write periods include a first write period exhibiting a first power consumption value, a second write period exhibiting a second power consumption value which is less than the first power consumption value, and a third write period without any power consumption.

15. The PCM system of claim 14, wherein the plurality of pipelines includes:
a first pipeline configured to have a single storage element;
a second pipeline configured to have a plurality of storage elements corresponding to the first write period;
a third pipeline configured to have a plurality of storage elements corresponding to the second write period; and
a fourth pipeline configured to have a single storage element.

16. The PCM system of claim 15,
wherein the clock signal includes a plurality of clock pulses;
wherein the single storage element of the first pipeline corresponds to an input period of the write command;
wherein the second pipeline has the same number of storage elements as the clock pulses which are created during the first write period; and
wherein the third pipeline has the same number of storage elements as the clock pulses which are created during the second write period.

17. The PCM system of claim 15, wherein a datum is stored into the single storage element of the first pipeline if the write command is inputted in synchronization with a first clock pulse of the clock signal.

18. The PCM system of claim 17,
wherein the datum stored in the single storage element of the first pipeline is transmitted to a first storage element of the second pipeline in synchronization with a second clock pulse of the clock signal;
wherein the datum stored in the first storage element of the second pipeline is shifted to a last storage element of the second pipeline through the storage elements between the first to last storage elements of the second pipeline in synchronization with third clock pulses sequentially created after the second clock pulse of the clock signal;
wherein the datum stored in the last storage element of the second pipeline is transmitted to a first storage element of the third pipeline in synchronization with a fourth clock pulse of the clock signal;
wherein the datum stored in the first storage element of the third pipeline is shifted to a last storage element of the third pipeline through the storage elements between the first to last storage elements of the third pipeline in synchronization with fifth clock pulses sequentially created after the fourth clock pulse of the clock signal; and
wherein the datum stored in the last storage element of the third pipeline is transmitted to the single storage element of the fourth pipeline in synchronization with a sixth clock pulse created after the fifth clock pulses of the clock signal.

19. The PCM system of claim 15,
wherein the first pipeline generates a first enablement signal, a level of the first enablement signal changing from a first level into a second level at a point of time that a datum is transmitted from the first pipeline to the second pipeline;
wherein the second pipeline generates a second enablement signal, a level of the second enablement signal changing from the first level into the second level at a point of time that a datum is transmitted from the second pipeline to the third pipeline; and
wherein the third pipeline generates a third enablement signal, a level of the third enablement signal changing from the first level into the second level at a point of time that a datum is transmitted from the third pipeline to the fourth pipeline.

20. The PCM system of claim 12, wherein each of the plurality of pipelines is realized by including a shift register.

21. The PCM system of claim 12, wherein arithmetic logic circuit incudes:
a plurality of multiplexers configured to output the deviations of the power consumption values in synchronization with the clock signal when data transmission between the pipelines occurs;
a full adder portion configured to perform an adding operation of output data of the plurality of multiplexers and a previous total power consumption value generated at a point of time that a previous clock pulse of the clock signal is created, and configured to output the result of the adding operation as a current total power consumption value generated at a point of time that a current clock pulse of the clock signal is created; and
a register configured to store the current total power consumption value and configured to send the current total power consumption value to the full adder portion at a point of time that a next clock pulse of the clock signal is created.

22. The PCM system of claim 21,
wherein the plurality of pipelines include a first pipeline having a single storage element, a second pipeline having a plurality of storage elements corresponding to a first write period exhibiting a first power consumption value during the write operation, a third pipeline having a plurality of storage elements corresponding to a second write period exhibiting a second power consumption value less than the first power consumption value during the write operation, and a fourth pipeline having a single storage element corresponding to a third write period; and
wherein the plurality of multiplexers include:
a first multiplexer configured to output the first power consumption value as a deviation of the first power consumption value in synchronization with the clock signal causing a data transmission from the first pipeline into the second pipeline and configured to output a datum corresponding to a value of "0" if no data transmission between the first and second pipelines occurs;
a second multiplexer configured to output a value remaining after subtracting the first power consumption value from the second power consumption value as a deviation of the second power consumption value in synchronization with the clock signal causing a data transmission from the second pipeline into the third pipeline and configured to output a datum corresponding to a value of "0" if no data transmission between the second and third pipelines occurs; and
a third multiplexer configured to output a value remaining after subtracting the second power consumption value from a value of zero as a deviation of the third power consumption value in synchronization with the clock signal causing a data transmission from the third pipeline into the fourth pipeline and configured to output a datum corresponding to a value of "0" if no data transmission between the third and fourth pipelines occurs.

23. The PCM system of claim 22, wherein the full adder portion includes:
a first full adder configured to perform a first adding operation of an output datum of the first multiplexer and an output datum of the second multiplexer to output the result of the first adding operation;
a second full adder configured to perform a second adding operation of an output datum of the third multiplexer and an output datum of the register to output the result of the second adding operation; and
a third full adder configured to perform a third adding operation of an output datum of the first full adder and an output datum of the second full adder to output the result of the third adding operation.

24. A method of calculating power consumption of a phase change memory (PCM) device, the method comprising:
setting a plurality of write periods which are distinguished according to a power consumption value during a write operation of the PCM device;
providing a plurality of pipelines respectively corresponding to the plurality of write periods;
shifting or transmitting data in the plurality of pipelines or between the plurality of pipelines in synchronization with a clock signal; and
performing an adding operation of all of deviations of the power consumption values at a point of time that data transmission between at least two of the plurality of pipelines occurs, to thus calculate a total power consumption value.

* * * * *